July 24, 1962  C. D. KEELY ET AL  3,045,402
MACHINE FOR AUTOMATICALLY MEASURING AND TAPING CARTONS
Filed Nov. 14, 1960  14 Sheets-Sheet 1

INVENTORS
CLIFFORD D. KEELY
RAYMOND J. BAISLEY
BY Berry & Crews
ATTORNEYS

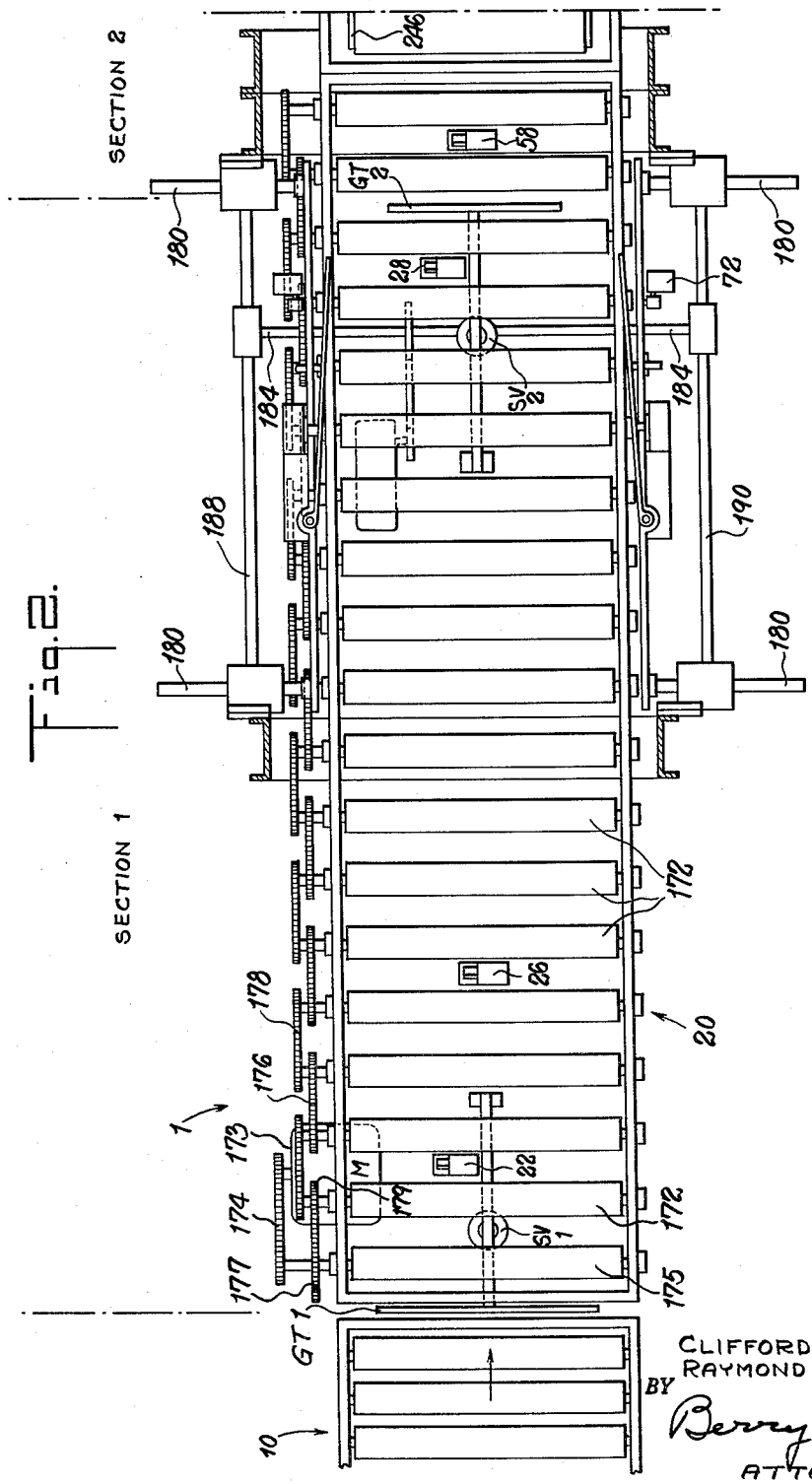

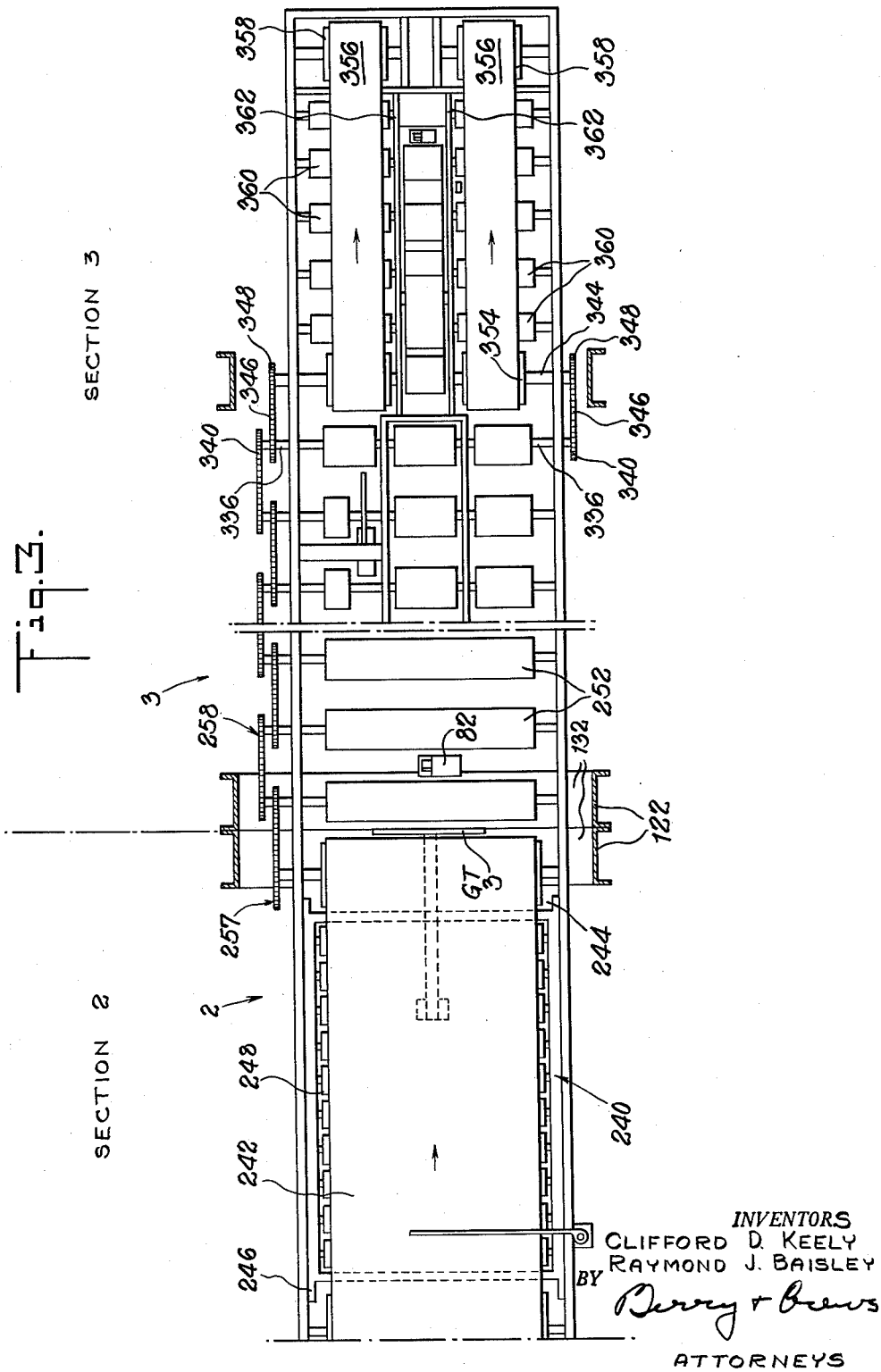

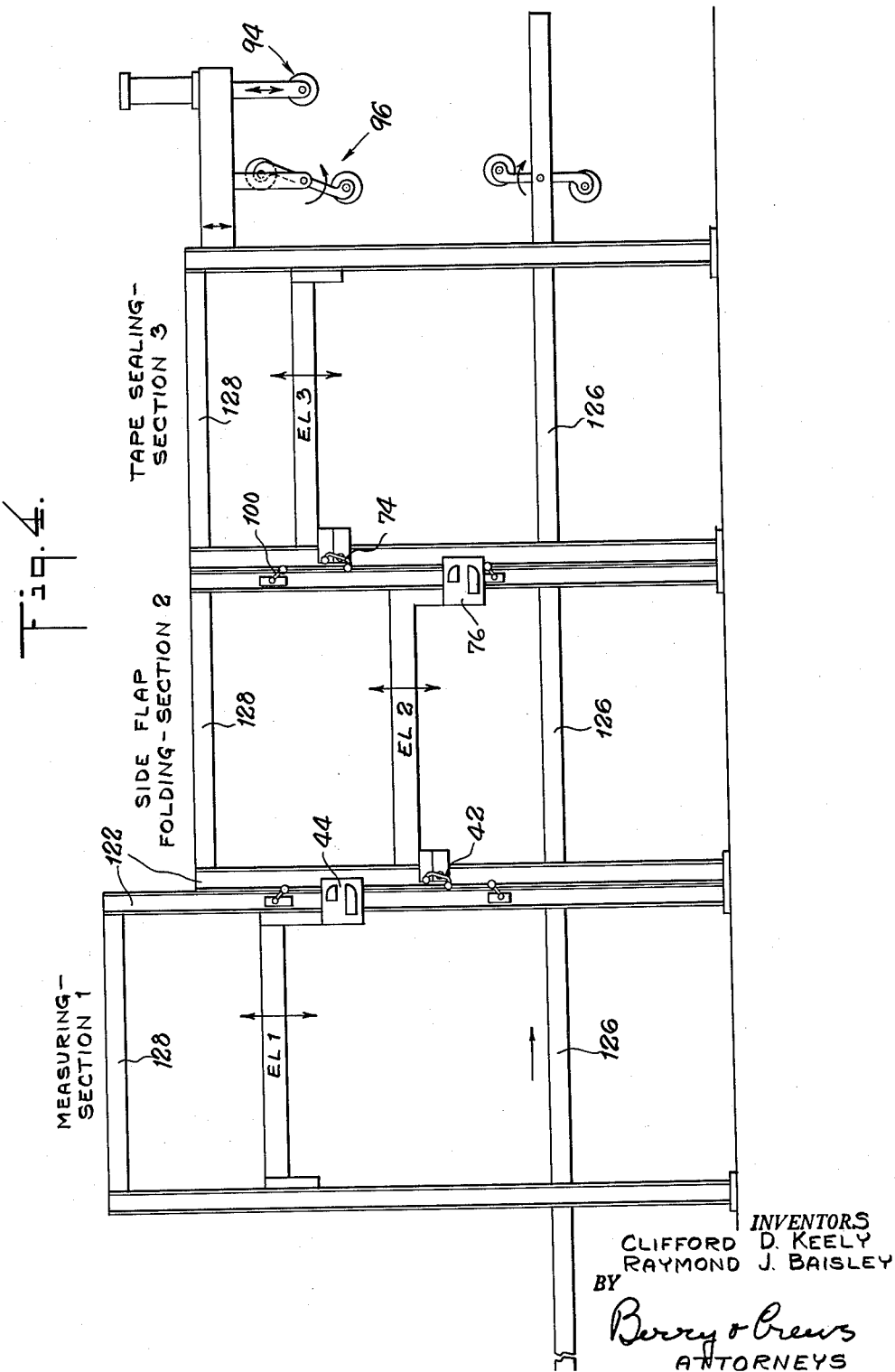

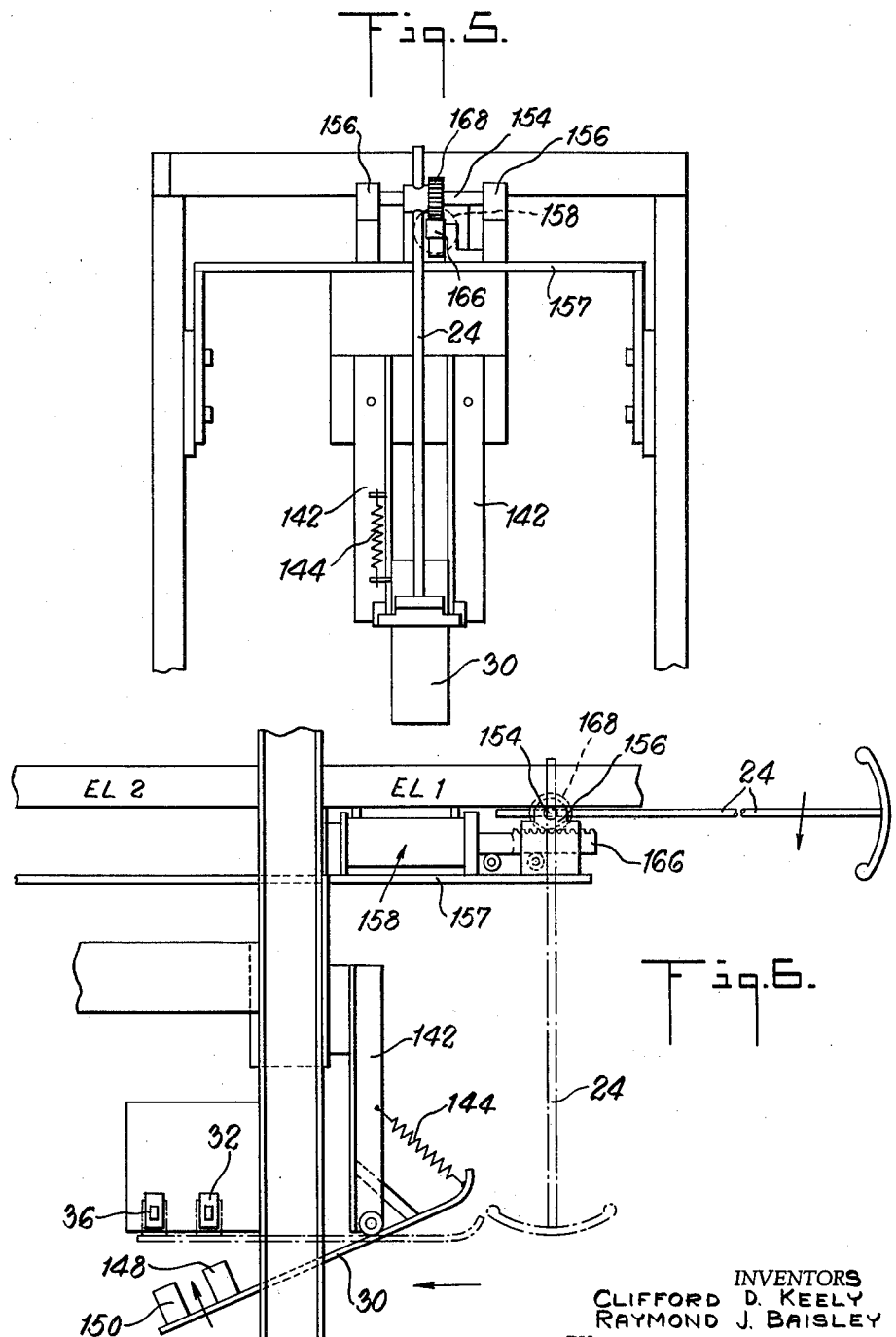

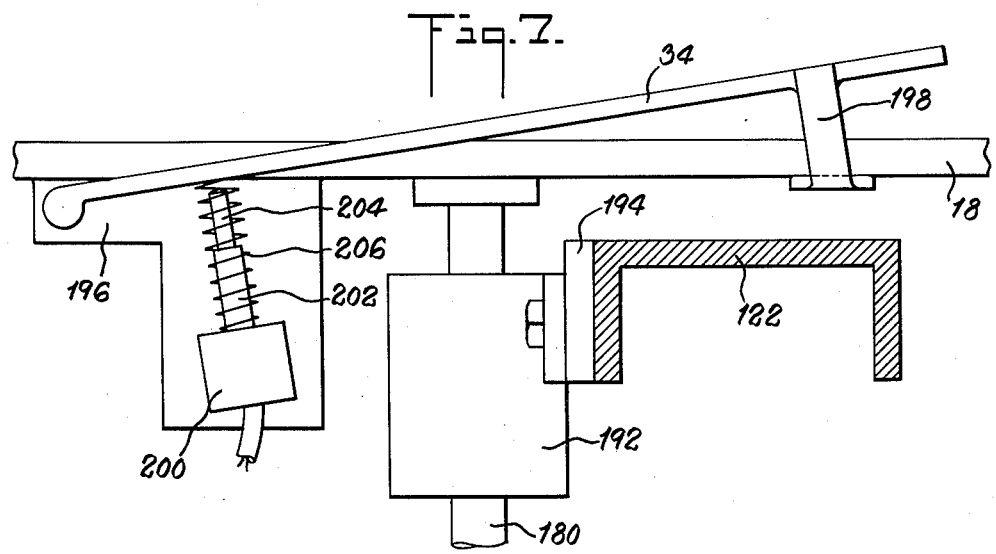
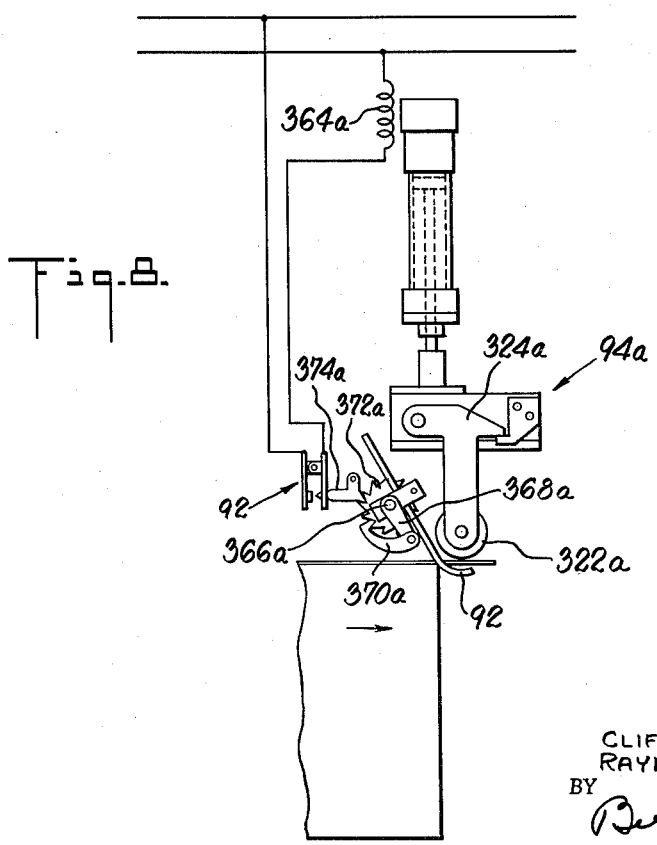

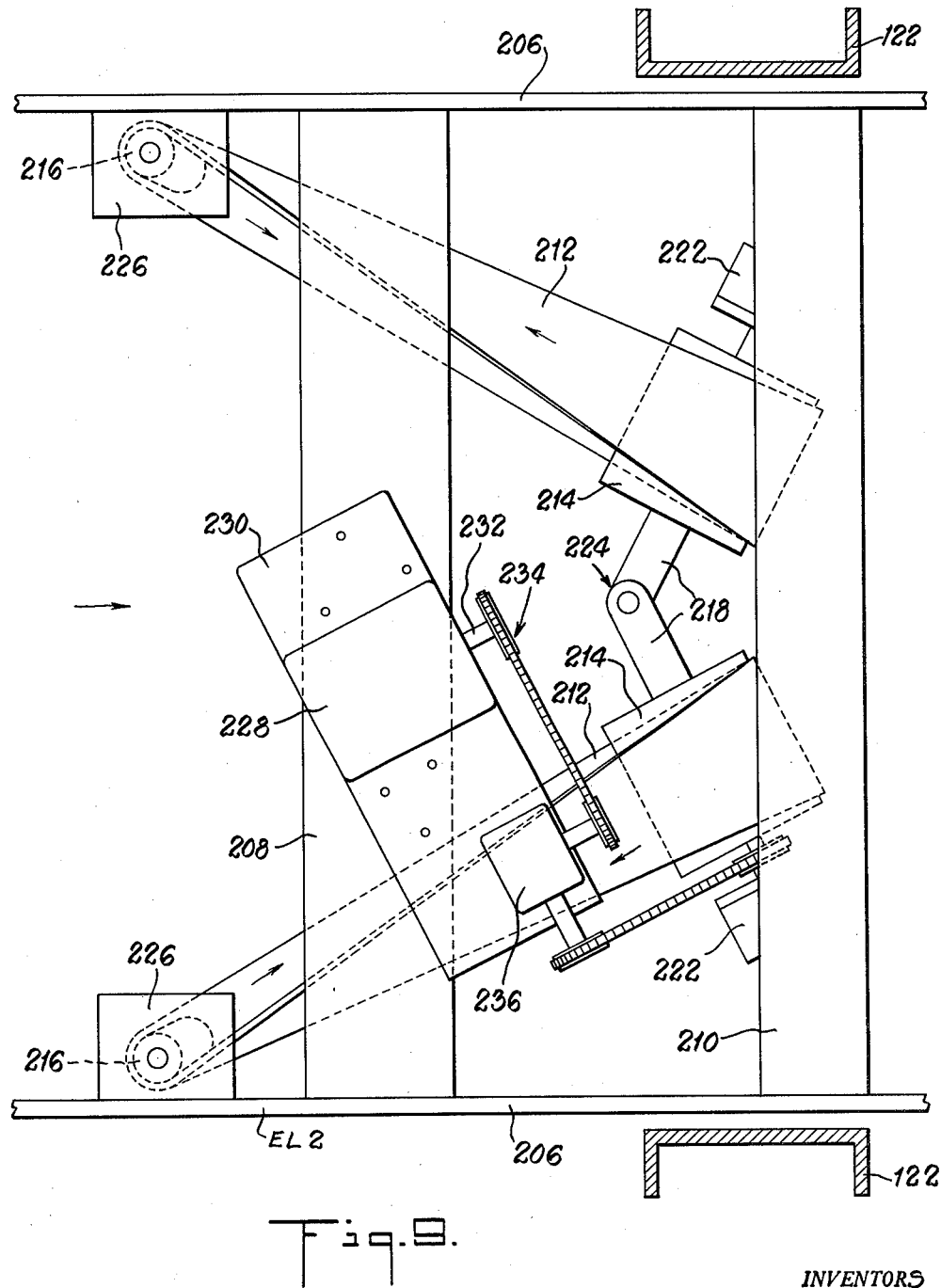

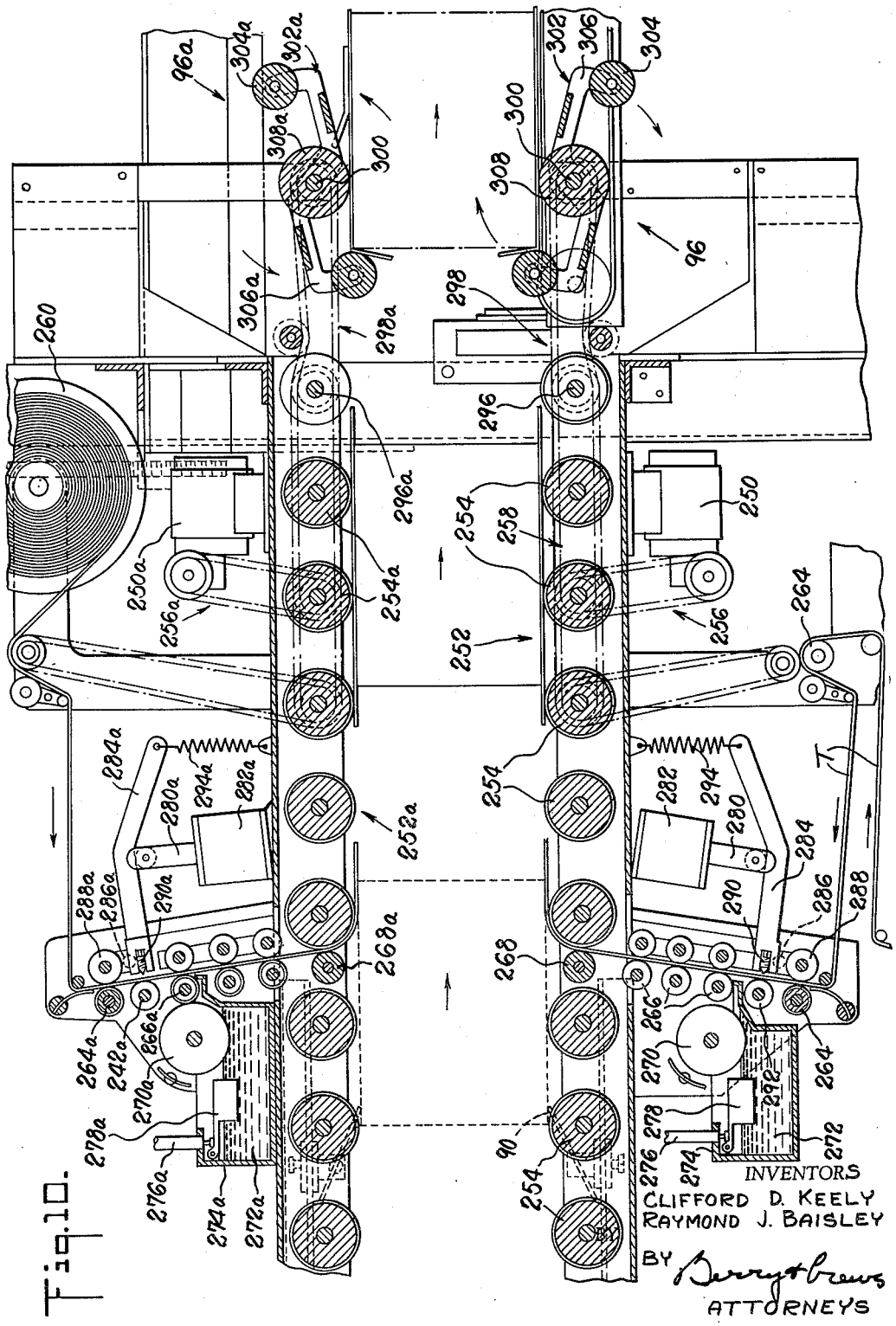

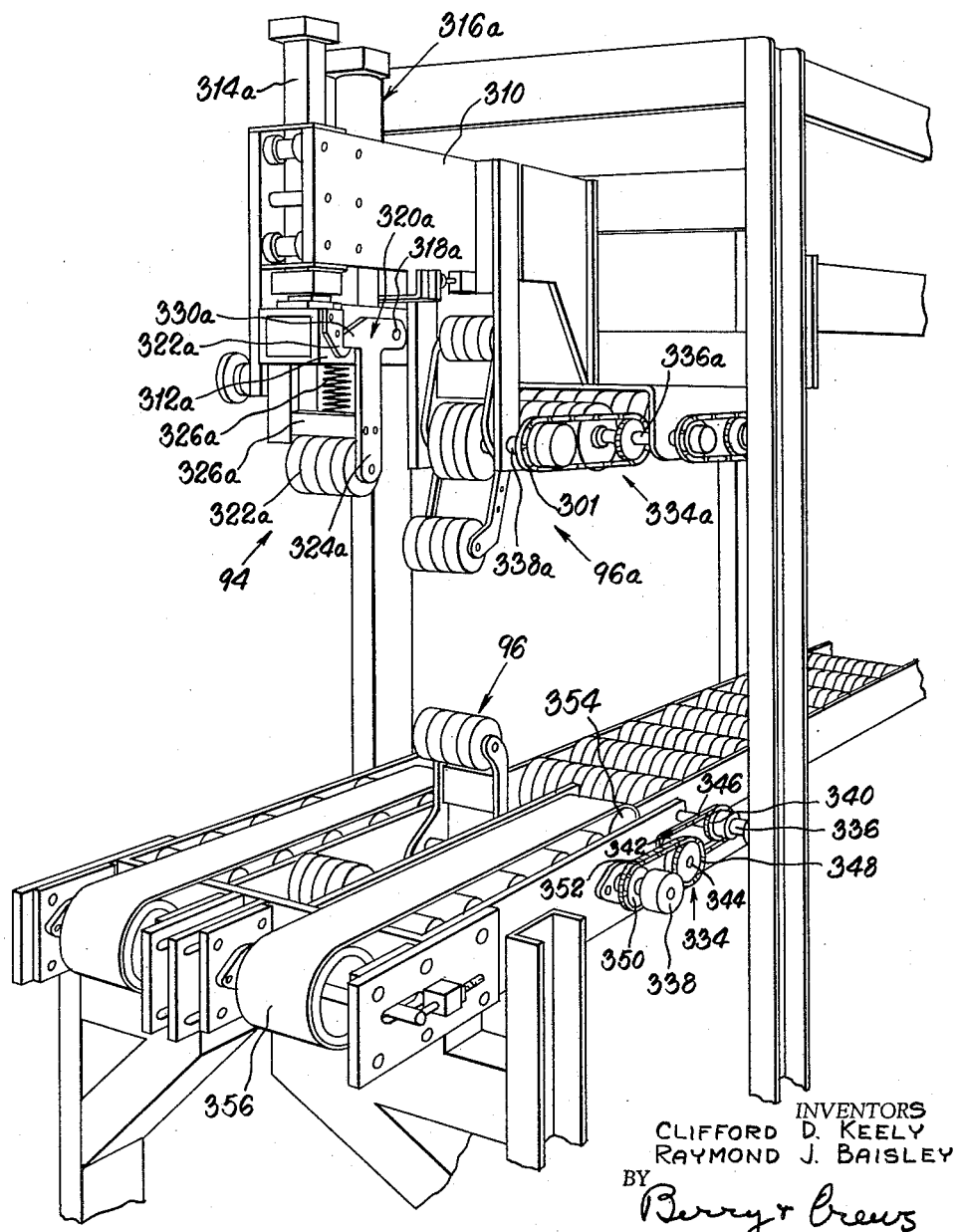

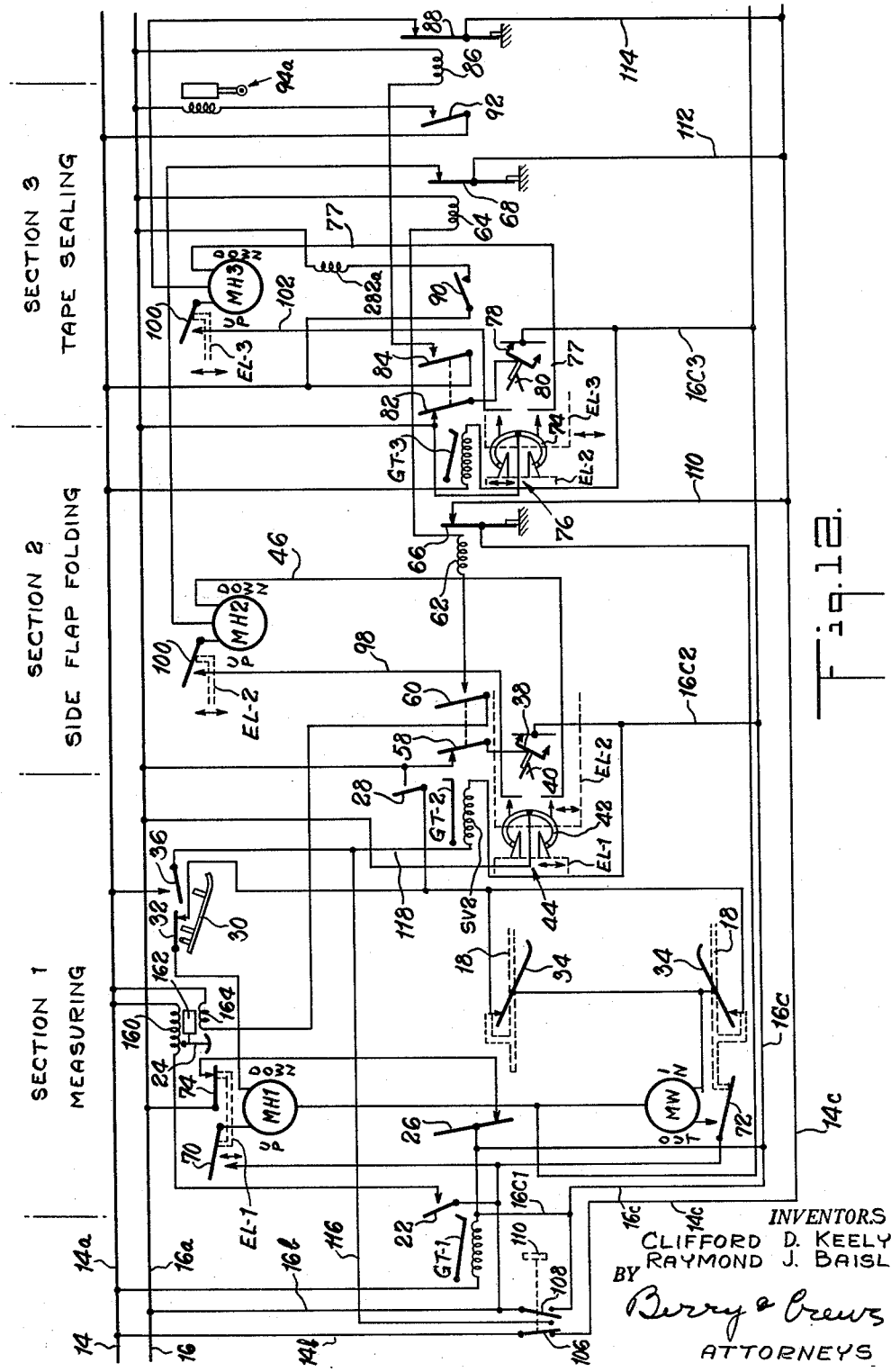

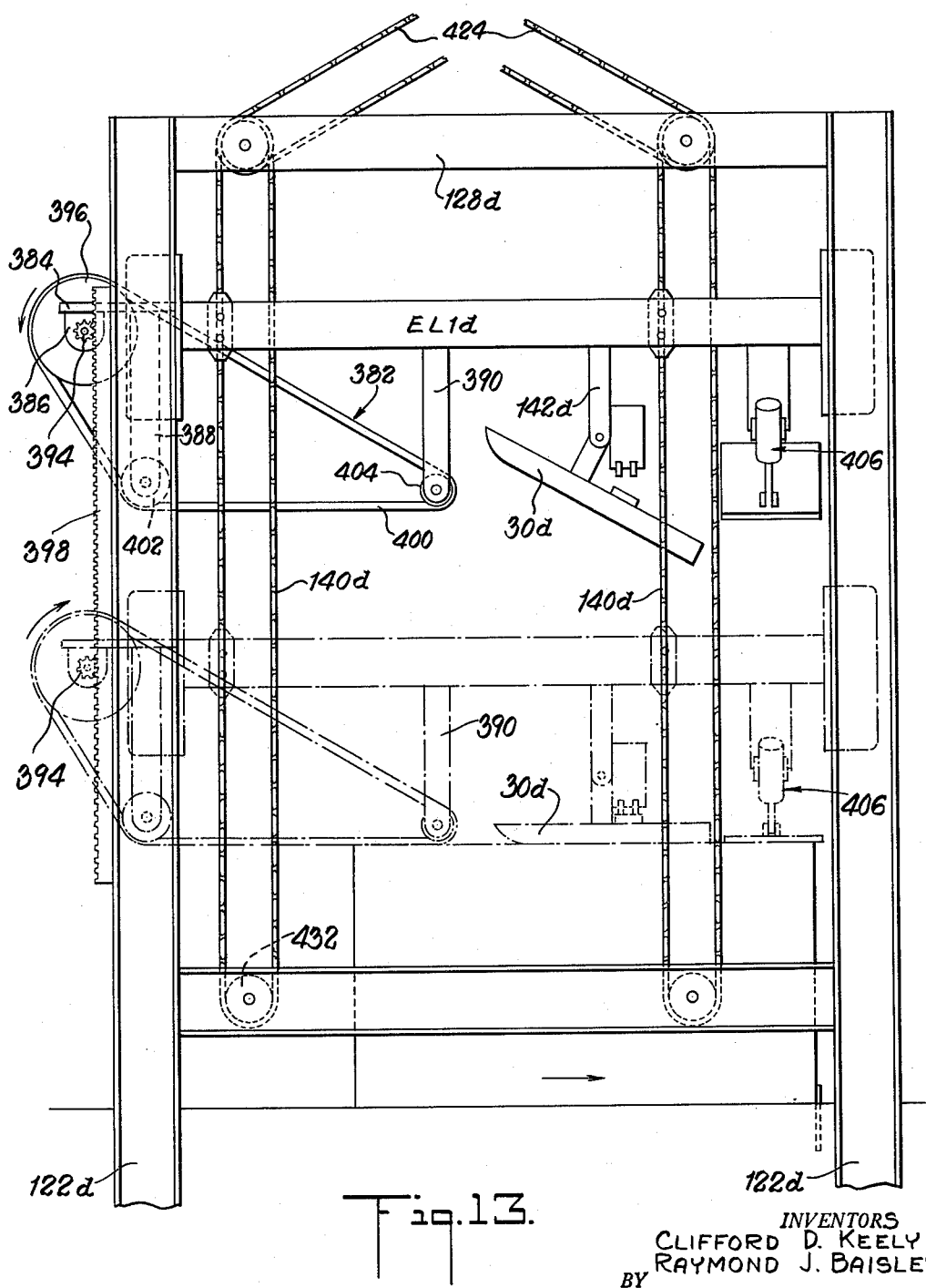

INVENTORS
CLIFFORD D. KEELY
RAYMOND J. BAISLEY
BY
ATTORNEYS

July 24, 1962 C. D. KEELY ET AL 3,045,402
MACHINE FOR AUTOMATICALLY MEASURING AND TAPING CARTONS
Filed Nov. 14, 1960 14 Sheets-Sheet 13

INVENTORS
CLIFFORD D. KEELY
RAYMOND J. BAISLEY
BY
*Berry & Crews*
ATTORNEYS

Fig. 16.

United States Patent Office 3,045,402
Patented July 24, 1962

3,045,402
MACHINE FOR AUTOMATICALLY MEASURING AND TAPING CARTONS
Clifford D. Keely, West Englewood, N.J., and Raymond J. Baisley, Hempstead, N.Y., assignors to General Corrugated Machinery Company, Inc., Palisades Park, N.J., a corporation of New Jersey
Filed Nov. 14, 1960, Ser. No. 69,130
27 Claims. (Cl. 53—66)

This invention relates to automatic carton taping machines having the novel characteristic of being self adaptable to the dimensions of cartons of widely varying widths, heights, and lengths.

It is now familiar practice to provide a carton taping machine having side guides adapted for ready adjustment to the widths of cartons throughout a wide range, overhead tape applying mechanism adapted for ready adjustment to the varying heights of cartons throughout a wide range, and tape feeding, cutting and pressing mechanism adapted to furnish and apply tape of appropriate lengths to the tops, or to the tops and bottoms of cartons of various lengths.

In these prior machines it has been necessary for an operator to adjust the side guides to the known width of a particular group of cartons, and to adjust the overhead tape applying mechanism and other associated mechanisms in accordance with the known height of the particular group of cartons. These adjustments have not only required human intervention, but they have consumed so much make-ready time as to make operation upon cartons which may vary in dimensions individually from carton to carton, economically impractical.

It is a primary object of the present invention to provide a fully automatic machine for taping cartons of widely varying dimensions.

It is a feature that during the processing of a carton, side guides are automatically moved outward to positions for clearing a carton of maximum acceptable width, and overhead mechanism is automatically moved upward for clearing a carton of maximum acceptable height, so that any carton within the size range of the machine may enter a first or measuring section of the machine. When this has occurred and a carton has been so accepted, the side guides located in the measuring section are automatically moved inward to center and align the carton, if necessary, and to assume guiding positions determined by the width of the particular carton for guiding the carton as it travels forward out of the measuring section. At the same time the overhead mechanism of the measuring section is moved downward automatically to an appropriate level determined by the carton itself.

Three illustrative embodiments of the invention are disclosed herein. In each of these embodiments the leading and trailing top flaps are folded down in the measuring section. In each of these embodiments the carton is detained in the measuring section until an overhead mechanism provided in a next following section of the machine has been set in response to the height measurement effected in the first section, at the level which is appropriate to the height of the carton.

In one embodiment the second section is a side flap folding section in which the vertically adjustable overhead mechanism consists of automatically acting side flap folding instrumentalities. When the carton has moved into the second section far enough to clear the first, the side guiding and height measuring mechanisms of the first or measuring section move out and up, respectively, and a fresh carton may then be admitted to the measuring section.

Having reference to the first embodiment of the invention, the carton admitted to the side flap folding section is detained in that section until a following automatic taping section has been cleared of any preceding carton and then adjusted for height to a setting corresponding to that of the second section. As the carton travels into and through the taping section it automatically causes a length of tape which exceeds the length of the carton by a predetermined amount to be fed out, moistened, cut and applied along the top, and pressed at its ends along the front and rear faces, of the carton. When the carton has been taped, the taping section is freed for automatic adjustment to the height setting of the preceding section.

In the further embodiments, side flap folding instrumentalities are included in the first or measuring section and the taping section becomes the second section of the machine. The same principles of coordination between sections is retained as in the first embodiment, but the machine is simplified, and is made more compact.

In each embodiment the overhead taping instrumentalities are desirably duplicated below, so that both the top and bottom of a filled carton may be automatically taped simultaneously.

It is an important feature that in certain forms of the invention referred to above the mechanism is adapted to be converted back and forth by the mere flip of a switch between operation on the basis of causing each box to be automatically individually measured, and advanced interruptedly as described above, and operation on the faster basis with cartons of uniform height and width, of eliminating individual measurement and of either eliminating or greatly reducing interruption of advance.

Other objects and advantages will hereinafter appear.

In the drawing forming part of this specification,

FIGURES 2 and 3 are complementary, horizontal, sectional views which jointly illustrate the machine from end to end;

FIGURE 4 is a view in side elevation of the machine, showing principally the frame work and the frame structure of the several sections including the elevators;

FIGURE 5 is a fragmentary view in end elevation, looking into the introductory end of the machine;

FIGURE 6 is a fragmentary view in side elevation of the mechanism illustrated in FIGURE 5;

FIGURE 7 is a detail view in horizontal section of one of a pair of side feeler arms through which the inward adjustment of the side guides is controlled;

FIGURE 8 is a partly electrical, partly mechanical view of roll-down mechanism employed in the taping section, and electrical control means therefor;

FIGURE 9 is a fragmentary plan view illustrating a portion of the side flap folding section and particularly the folding belts thereof;

FIGURE 10 is a view in sectional elevation showing the taping mechanisms;

FIGURE 11 is a fragmentary perspective view of the discharge end of the machine;

FIGURE 12 is an electrical diagram illustrating the electrical mechanism through which the operating instrumentalities of the machine are coordinately controlled and operated;

FIGURE 13 is a fragmentary view in side elevation of a modified measuring section in which side flap folding means are included, and an alternative form of rear flap folder is included;

FIGURE 15 is a perspective view of a second practical and advantageous illustrative embodiment of the invention; and FIGURE 16 is an electrical diagram illustrating the mechanism through which the operating instrumentalities of the machine of FIGURE 15 are coordinately controlled and operated.

In order that a comprehensive preliminary understanding of the illustrative machine of FIGURES 1 to 12 may be had, the machine will first be described by reference merely to its principal parts and with little attention to detail. In this connection reference will be had principally to FIGURES 1, 2, 3, 4, 10, 11 and 12.

Since the salient novelty of the invention resides in the capability of the machine automatically to accommodate itself to cartons which vary in height and width, the preliminary description will be directed, except where otherwise stated, to the setting of the machine which provides for automatic accommodation.

Figure 1:
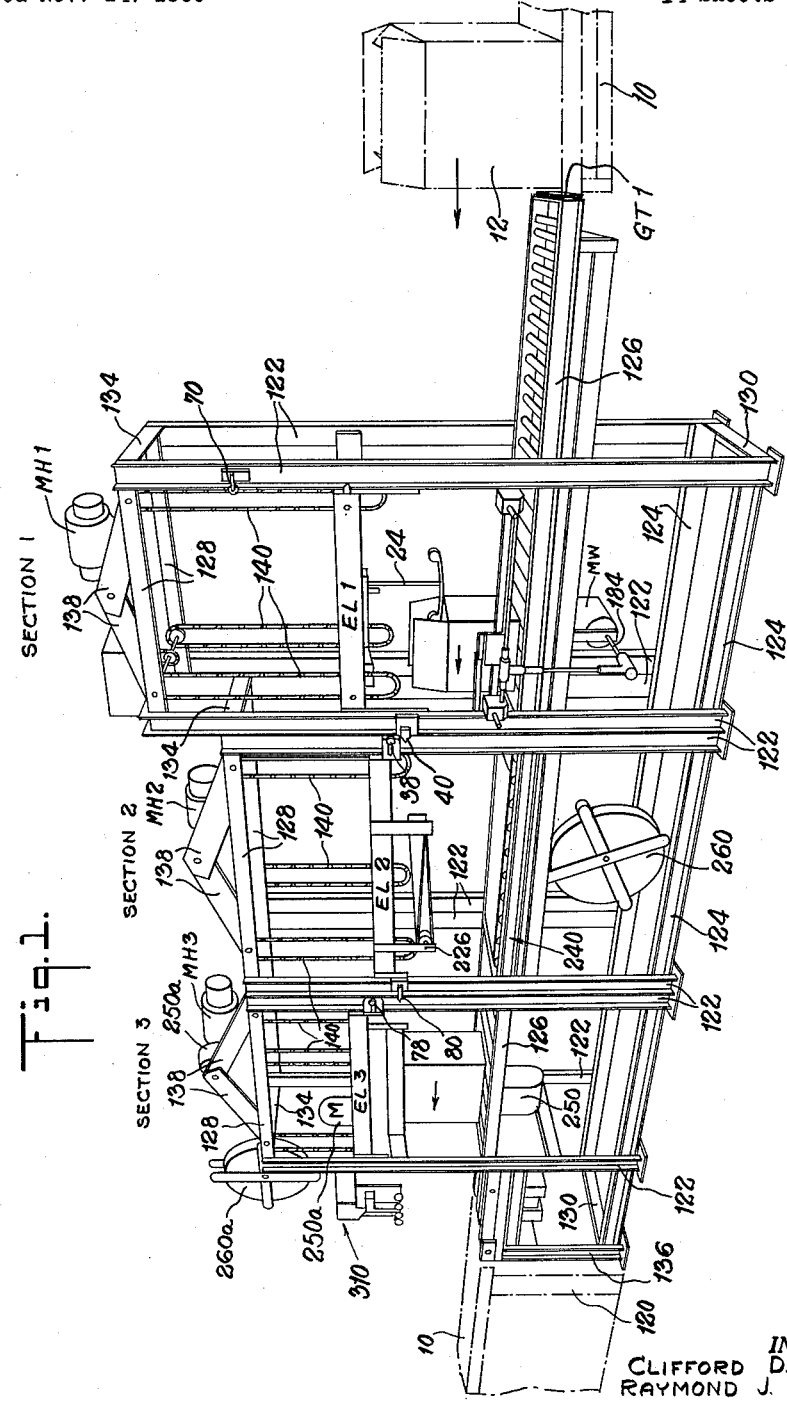
FIGURE 1 is a perspective view of a first practical and advantageous illustrative machine which embodies features of the invention, as seen from one side of the machine at the introductory end thereof.

The cartons to be taped are brought to the machine on a conventional gravity conveyor 10, a fragment of which is indicated in FIGURE 1 with a single carton 12 supported upon it. Ordinarily there would be a considerable number of cartons upon the conveyor 10, each carton other than the foremost pressing forward against the rear face of the carton which precedes it and the foremost carton pressing forward against a gate GT1. As a rule the cartons enter the first or measuring section of the machine with the front, rear and side flaps extending substantially straight upward.

The machine comprises three successive sections through which the cartons pass. Section 1 is a measuring section, section 2 is a side flap folding section, and section 3 is a taping section. The sections 1, 2 and 3 are preceded by gates GT1, GT2 and GT3, respectively, and they include elevators EL1, EL2 and EL3, respectively.

At the beginning of the day, with the power turned off and the machine clear of cartons, the gate GT1 will stand in its raised or closed condition, being spring impelled to that condition. When the main switch, not shown is closed to supply electric power through conductor mains 14 and 16, gates GT1 and GT3 are opened by electromagnets SV1 and SV3. The opening of gate GT1 allows the first carton to enter the measuring section. At this time, the elevator EL1 will be in its uppermost position, and centering and side-guiding members 18 will be in their outermost positions. Any carton within the capacity of the machine may therefore enter the measuring section and be advanced by a constantly running conveyor 20 to gate GT2.

As the first carton advances through the measuring section to the gate GT2, it closes a switch 22 and thereby causes a rear flap folder 24 to be swung rearward and upward to a retracted position in which it is clear of the upstanding front and rear end flaps of the carton. The carton next engages and opens the switch 26, causing the electromagnet SV1 to be deenergized so that the gate may be urged upward by spring pressure against the overlying carton, and may be caused to return to its upper or closed position as soon as the trailing end of the carton has passed the switch 26.

Just before the carton is arrested by the gate GT2, it closes a switch 28. This causes a height regulating motor MH1 to drive the elevator EL1 downward until a pivoted feeler arm 30, which is carried by the elevator EL1, is rocked by engagement with the top of the carton into a substantially horizontal position. At this point the downward travel of the motor MH1 is arrested through the opening of a switch 32 by the arm 30. Closing of the switch 28 also causes a width adjusting motor MW to drive the guides 18 equally and oppositely inward until two feeler arms 34 carried by and with the guides 18 have both been swung by engagement with the carton sides to circuit breaking positions. If one feeler breaks its circuit branch before the other, the guides will continue inward until the second circuit branch is broken, in the meantime straightening and/or centering the carton.

As the feeler arm 30 attains its uppermost or horizontal position, it engages and closes a switch 36 through which an electromagnet SV2 may be energized for opening the gate GT2 and admitting the carton to the second section. Before the carton may be admitted to the second section, however, it is necessary that the elevator of the second section be adjusted to the appropriate level for operating upon the carton which has been measured in the first section and for which the elevator EL1 has been correctly adjusted. In series circuit with the switch 36 and the winding SV2, there is provided a switch member 38 which is carried by the elevator EL2 and controlled by a cam 40 on the elevator EL1. The switch 38 has a neutral position in which it open-circuits the winding SV2, but whenever the elevator EL2 is adjusted to correspond to the adjustment of the elevator EL1, the operating arm of the switch will be tilted by a cam 40 to one side or the other of neutral and will be retained in a circuit-closing position. The admission of the carton to the second section is, therefore, made to wait upon the attainment of the correct height adjustment of the elevator EL2.

Height adjustment of the elevator EL2 is effected by a height adjusting motor MH2 under the primary control of a rockable switch 42. The switch 42 is rockably mounted on the elevator EL2 and is controlled by a divided cam 44 on the elevator EL1. As shown in FIGURE 12, the elevator EL2 has been properly adjusted relative to the elevator EL1, the switch member 42 stands in its neutral or open condition, and no circuit can be completed through the switch member. Whenever the cam 42 stands at a lower level than that illustrated relative to the switch 42, the switch member 42 will be operated counterclockwise and will make engagement with a conductor 46 through which the motor MH2 may be energized, subject to other controls, for driving the elevator EL2 downward. If, on the other hand, the switch member 42 were located at a lower level than the cam 44 (as it frequently would be in practice) the switch member 42 would be tilted clockwise and would make engagement with a conductor 48 through which the motor MH2 may be energized, subject to other controls, for driving the elevator EL2 upward. Whatever the direction of travel of the elevator EL2, such travel will be arrested upon the arrival of the switch member 42 at the condition relative to the cam 44 which is illustrated in FIGURE 12.

At the start of the day, with the elevators EL1 and EL2 both in their uppermost positions, as shown in FIGURE 12, the downward measuring movement of the elevator EL1 will rock the switch member 42 counterclockwise and will cause the elevator EL2 to be driven downward almost in unison with the elevator EL1 and to come to rest substantially at the same time that the elevator EL1 comes to rest.

Completion of the adjustment of elevator EL2 will reestablish the closed condition of switch 38 as illustrated in FIGURE 12, thereby causing the winding SV2 to be energized and the gate GT2 to be opened. This permits the carton to advance into the second section. As the carton again moves forward, it opens a switch 58 and thereby deenergizes the electromagnet SV2, causing the gate GT2 to be freed for upward movement under the impulsion of a spring (not shown). The gate GT2 is held down by the overlying carton, but as soon as the trailing end of the carton has cleared the gate, the gate swings upward to its closed position.

At the same time that the carton opens the switch 58, it closes a switch 60, causing the flap closer 24 to be swung forcibly downward and forward against the upstanding rear flap of the carton. This folds the rear flap forward and downward to a horizontal position and causes it to be held in that position as the flap travels forward into engagement with the lower face of the feeler arm 30. While the arm 30 has been referred to as a feeler arm, it is considerably more than that, since it serves also as a folder for the front flap of the carton and as a hold-down for the front flap and then the rear flap as the carton moves forward.

Closing of the switch 60 also causes windings 62 and 64 to be energized for setting switches 66 and 68 in open positions. The opening of the switch 66 prevents operation of the motors MW and MH1 until after the switch 66 has been engaged and reclosed by the leading end of the advancing carton. The switch 66 is so located that the carton will have moved clear of the first section before the upward travel of the motor MH1 and the outward travel of the motor MW can be initiated.

With the reclosing of the switch 66, the elevator EL1 will be driven to its upper limit, being brought to rest by the opening of a switch 70, and the guides 18 will be driven to their outer limits, being brought to rest by a limit switch 72. The arrival of the elevator EL1 at its upper limit of movement, closes a switch 74 and thereby causes the electromagnet SV1 to be energized for opening the gate GT1 and admitting another carton to the measuring section. At this time all the operating mechanism of the measuring section is free to respond to the new carton in the manner already described. The downward travel of the elevator EL1 is initiated by closing of the switch 28 by the new carton.

The elevator EL2 does not move upward with the elevator EL1 because at this time the switch 68 still stands open, and the closing of switch 68 is a necessary condition precedent to the further operation of the motor MH2 in either direction. This is a necessary safeguard because the elevator EL2 must not be disturbed in position until the first carton has moved clear of the second section. The switch 68 is located in the third or taping section for engagement by the carton after the carton has cleared the second section. Before the carton can reach the switch 68, however, it must pass the gate GT3, and before the gate GT3 can be opened, the elevator EL3 must be adjusted in height to correspond to the adjustment of the elevator EL2.

The principle of control of the elevator EL3 from the elevator EL2 is the same as that described for the control of the elevator EL2 from the elevator EL1. At the start of the day, however, all sections will be clear, and all elevators will be in their uppermost positions as illustrated in FIGURE 12. Before the elevator EL2 moves downward, a switch member 74 carried by the elevator EL3 stands in its neutral condition embracing a divided cam 76 on the elevator EL2. As the elevator EL2 moves downward, however, the switch member 74 is rocked counterclockwise and is thereby caused to establish connection with a conductor 76 through which the motor MH3 is driven in a direction to lower the elevator EL3. The elevator EL3 moves downward substantially in unison with the elevator EL2 until, at the proper level, the illustrated relation of switch member 74 to cam 76 is reestablished. The reestablishment of this condition also reestablishes the illustrated condition of the switch member 78 carried by elevator EL3 to cam 80 carried by elevator EL2. This completes a circuit through SV3 for opening the gate GT3 and hence the first carton finds the gate GT3 in an open condition.

As the carton moves into and through the third section, it opens a switch 82 and thereby deenergizes the winding SV3. The gate GT3 is thereby released to press upward against the overlying carton and to close as soon as it is cleared by the carton. Simultaneously with the closing of the switch 82 by the carton, a switch 84 is closed by the carton. Closing of the switch 84 causes a relay winding 86 to be energized and this in turn opens a switch 88, setting it to an open position and thereby rendering the motor MH3 temporarily inoperable.

As the carton continues its advance through the third section it engages and closes a switch 90 thereby causing a length of tape, which is longer than the carton itself by a predetermined amount to be automatically fed out, moistened and applied to the traveling carton. The tape is cut off with one end portion of predetermined length protruding beyond the leading end of the carton and another end portion of substantially the same length protruding beyond the trailing end of the carton. The cutting off of the tape is effected as the carton clears the switch 90. The surplus length of the tape is accounted for by the fact that the actuating arm of the switch 90 extends for a substantial distance in the direction of carton travel.

After the carton has cleared the second section, it engages and closes the switch 68 thereby freeing the motor MH2 for operation to adjust the elevator EL2 to the level of the elevator EL1. This may be to the upper limit if no following carton has entered the measuring section and been measured, or it may be to a new position of elevator EL1 as determined by a new carton measurement.

The first carton next closes a switch 92 to set into operation a roll-down device 94 whereby the protruding leading end of the tape is rolled down across the leading end of the carton. The roll-down device starts downward in time to intercept momentarily and arrest the carton, but releases the carton for resumed forward movement as it moves upward to a position clear of the carton.

An untimed, continuously operating roll-over mechanism 96, which is disposed a short distance ahead of the roll-down mechanism 94, serves to roll the protruding trailing end of the tape against the rear face of the carton without interrupting the advance of the carton.

The carton finally engages and closes a switch 88, thereby freeing the motor MH3 for operation to adjust the elevator EL3 into correspondence with the elevator EL2. The second carton may, of course, be either of greater or less height than the first carton. When the second carton is of greater height than the first and the elevator EL2 has been adjusted to the height of the second carton but the elevator EL3 has not, the switch member 74 will stand in a position to make connection with a conductor 102 through which the motor MH3 is caused to drive the elevator EL3 upward.

When, on the contrary, the elevator EL3 requires adjustment to a lower level, the switch 74 will stand in a tilted position to make connection with a conductor 76 through which the motor MH3 is energized to drive the elevator EL3 downward.

The machine of FIGURES 1 to 12, when operated as above described, is a very practical and satisfactory machine. It is unique in its capability for automatically taping cartons which continually vary in height and width. With the delays for measurement, however, it is necessarily limited in its rate of output as compared with a conventional machine which operates on cartons of uniform dimensions only, and through which the cartons are advanced without interruptions. It is a feature of the invention that a mere flip of a switch is required in order to convert the machine of FIGURES 1 to 12 into a machine of the latter class.

It will be observed that the conductor mains 14 and 16 are connected, respectively, with principal branch conductors 14a and 16a and with secondary branch conductors 14b and 16b. The conductors 14b and 16b may be connected through two-position switches 106 and 108, respectively, with conductors 14c and 16c. The switches 106 and 108 are desirably connected for operation by a common operator 110. When the machine is set for automatic adjustment, as above described, the switch member 106 is maintained in conductive engagement with conductor 14c, and the switch 108 is maintained open, but when the machine is set for continuously putting through cartons of uniform heights and widths, the operator 110 is actuated to reverse the conditions of these switches—that is to say, to swing the switch 106 out of conductive engagement with the conductor 14c and to swing the switch 108 into conductive engagement with the conductor 16c.

In the setting for automatic adjustment, conductors 110, 112 and 114 are live at all times, being connected through 14c and 14b to conductor 14. The live conditions of the conductors 110, 112 and 114 are essential, respectively, to the operability of the motors MH1 and MW, MH2, and MH3. When the switch 106 is opened, therefore, the motors MW, MH1, MH2 and MH3 are disabled, with the consequence that the side guides 18 and the elevators EL1, EL2 and EL3 are caused to hold the positions in which they are set at the instant of switch opening Operation of the switch 106 to open-circuit conductor 14c, establishes a fixed connection from 14b through the switch 106 and conductors 116 and 118 to the winding SV2. In the setting for automatic adjustment, the switch 108 stands open and thereby renders the conductor 16c and its branch conductors 16c1, 16c2 and 16c3 ineffective to complete any circuit. The closing of switch 108, however, causes the conductors 16c1, 16c2 and 16c3 to establish and maintain uninterrupted connection of the windings SV1, SV2 and SV3, respectively, with the conductor 16. The winding SV1, SV2 and SV3 are therefore continuously energized, and the gates GT1, GT2 and GT3 are continuously held open.

As an alternative to the provision of conductor 116, the feeler 30 might be arranged to be electromagnetically detained, under control of the operator 110 at its upper limit of movement, so as to hold the switch 36 continuously closed and thereby maintain energization of the winding SV2. As a further alternative, the conductor 116 may be omitted and the arm 30 may be left free to drop down between cartons since the switch 36 will always be closed by the carton engaged feeler arm 30 by the time the carton reaches the gate GT2 and will cause the gate GT2 invariably to be opened in time to avoid the arresting of the carton.

Before shifting the operator 110 to open-circuit conductor 14c and to connect in circuit the conductor 16c, the person in charge of the machine would briefly hold back the leading one of the uniform cartons on the conveyor 10 long enough to let any carton or cartons in the machine pass out of the machine. He would then release the carton which he has been holding to let it enter the measuring section and would thereafter actuate the operator 110 to throw the switches after the leading end of the carton had passed the gate GT2 and before it had reached the switch 66. At this time the elevators would all be adjusted to the proper, common level and the guides 18 would be adjusted to the proper width. As the leading carton enters the measuring section, it pulls away from the next following carton, leaving a space into which gate GT1 can enter as the leading carton clears the gate.

When it is desired to switch back to automatic adjustment, the first of the irregular cartons would be held back until the last of the uniform cartons had cleared the machine, and the operator 110 would then be actuated to switch in conductor 14c and switch out conductor 16c. The operator would then release the carton which he has been holding back, and the automatic operation would proceed as described in connection with the start of a day's operations.

The introductory conveyor 10 has its own rigid frame 120. While this conveyor has been described as a gravity conveyor it could, of course, be driven throughout its length at a relatively slow speed, or be made to include one or more rollers at its discharge end which are driven at a relatively slow constant speed. The machine itself is fully operative in conjunction with any kind of conveyor which yieldingly advances the cartons at a substantially slower speed than the speed of the conveyor 20. The difference of speed is important primarily because the leading carton, when admitted to the machine by gate GT1, should pull away from the following carton, leaving a space into which the gate GT1 may enter as soon as the leading carton has cleared the gate.

The machine proper includes a frame which, though unitary and rigid in the final assembly, may be built in sections for convenience in loading, unloading, shipping and installation of the machine itself. The frame is composed of tall upright channel bars 122 at opposite sides of the machine, longitudinal bars 124, 126 and 128, and transverse bars 130, 132 and 134. At the introductory end, longitudinal bars 126 extend well beyond the terminal uprights 122. At the discharge end longitudinal bars 124 and 126 extend well beyond the terminal uprights 122 and are connected with shorter upright channel bars 136.

The frame portion of section 1 is supplemented at the top by a frame superstructure which comprises members 138 for supporting the motor MH1 and mechanism operated by the motor. The structure is duplicated for the other sections so that a description of section 1 will suffice for all, and like reference characters have been applied in all sections. The motor MH1 is connected through suitable gearing (not shown) to drive four endless chains 140. The chains run upon, and depend from, sprockets (not shown), which sprockets are revolubly mounted at opposite ends of each side of the frame on the bars 128.

Two arms 142 extend downward from the elevator EL1 and provide pivotal support for the feeler arm 30. The arm 30 is biased toward the position in which it is illustrated in FIG. 6 by a tension spring 144, being limited to the position shown by a stop arm 146 which is mounted on one of the arms 142. The arm 30 is rocked clockwise, as viewed in FIG. 6, by engagement with the front flap at the top of a carton as the elevator EL1 moves downward. The arm is provided with switch actuating projections 148 and 150 for cooperating, respectively, with normally closed switch 32 and normally open switch 36. The switches 32 and 36 are carried on a bracket 152 which is fixed upon the elevator EL1.

The anchor shaped rear flap closer 24 is fast on a shaft 154, which shaft extends transversely of the machine and is supported in bearing arms 156 of the elevator EL1. A shelf 157 of the elevator EL1 supports a pneumatic actuator 158 for the rear flap closer 24. The actuator 158 is a familiar commercial device, being exemplified by the Bellows Air Motor as made by the Bellows Company of Akron, Ohio. The actuator 158 is that type of air motor in which energization of one solenoid winding 160 sets a valve (not shown) to cause air under pressure to be admitted to one end of a cylinder 162 and to permit air to be discharged from the second end, while energization of another solenoid winding 164 resets the valve to cause air under pressure to be admitted to the second end of the cylinder and to permit air to be discharged from the first end. The air motor includes a piston (not shown) and a rigid piston rod which terminates in a rack 166. The rack 166 is constantly in mesh with a pinion 168 which is fast on the shaft 154. Energization of the solenoid 160 through closing of the switch 22, drives the rack 166 outward from the cylinder and swings the flap closer counterclockwise as viewed in FIG. 6, to the full line position in which it is shown in that figure. Subsequent energization of the winding 164 through closing of the switch 60, drives the rack 166 inward relative to the cylinder and swings the flap closer clockwise as viewed in FIG. 6, to the broken line position in which it is shown in that figure.

The conveyor 20 comprises a multiplicity of identical rollers 172. A drive motor 173 is connected through a chain drive 174 to drive a slow speed roller 175, which precedes the conveyor, continuously and at uniform speed. The shaft of roller 175 is connected through chain gearing which includes large and small sprockets 177 and 179 to drive the first roller 172 of the conveyor at considerably faster rotary and peripheral speeds than the corresponding speeds of the roller 175. The roller 175 serves, when the machine is set for non-measuring operation, to hold back each carton relative to its predecessor long enough to provide a desirable spacing between cartons. Each roller 172, other than the extreme rollers of the series, is connected to one of its neighbors through an inner drive chain 176 and to another of its neighbors through an outer drive chain 178. All the rollers, therefore, turn at the same peripheral speed and tend to advance the cartons at a uniform speed.

The side guides 18 are made fast at their opposite ends upon racks 180, the racks being connected for equal, simultaneous operation to adjust the side guides in and out while maintaining them in parallelism with the longitudinal center line of the machine. The motor is supported beneath the conveyor 20 from a beam 182, and has an output shaft 184 whose ends extend outward from the motor toward the opposite sides of the machine. The shaft 184 is connected to drive vertical shafts 186 through gearing (not shown), the latter shafts, in turn, being connected to drive shafts 188 and 190 in opposite directions. The shafts 188 and 190 have fast upon them gears (not shown) for engaging and driving the guide carrying racks 180 coordinately. Coordination in this context requires that the side guides be driven inward simultaneously and to equal extents and that they be driven outward simultaneously and to equal extents, and this is the kind of operation which is produced by the described mechanism.

Details of the mounting and control means for the side guides may be seen in FIG. 7. The mechanism here illustrated is provided in duplicate at opposite sides of the machine. Gear boxes 192 are supported from frame members 122 through brackets 194. Each rack 180 extends through one of the gear boxes and is attached to a side guide 18 near one end thereof. Each side guide 18 carries a bracket 196 upon which one of the feeler arms 34 is pivoted for inward and outward swinging movement. Each arm is provided with a stop arm 198 which extends over, and normally bears against an outer face of, the associated side guide 18. The housing of a switch 200 is secured upon each bracket 196. The switch housing includes a sleeve 202 and an actuator stem 204, both of which extend toward the feeler 34. A compression coil spring 206 surrounds the sleeve 202 and the actuator stem 204 and bears at its opposite ends against the feeler 34 and the housing of the switch 200, respectively. The spring urges the feeler counterclockwise (as viewed in FIG. 7) maintaining it, in the absence of a carton, in the position illustrated. In this position the actuator 204 is not engaged by the feeler 34 and the normally closed switch 200 remains closed.

The elevator EL2 comprises side bars 206 and cross plates 208 and 210. Folding belts 212 run at their forward ends upon comparatively large diameter, horizontally disposed pulleys 214 and at their rear ends upon comparatively small diameter, vertically disposed pulleys 216. The forward pulleys 214 are carried upon drive shafts 218 and 220, respectively, which are supported from the plate 210 in depending brackets 222. The shafts 218 and 220 are connected to one another through a universal joint 224 as that the latter shaft is driven from the former. The pulleys 216 are disposed out near the side bars 206, being supported in brackets 226, whereas the pulleys 214 are disposed well in from the side bars 206 so that the lower, active runs of the pulleys 212 converge as they travel forward from the pulleys 216 to the pulleys 214.

The shafts 218, on which one of the pulleys 214 is made fast, is driven by a motor 228 which is supported from the crossplate 208 upon a platform bracket 230. The motor shaft 232, through chain gearing 234, drives gearing (not shown) which is located within a gear box 236. The gear box 236 is mounted on the bracket 230. The gearing in the box 236 is connected through chain gearing 238 to drive the shaft 218. The motor 228 is driven at constant speed.

The twisted active runs of the belts 212 exert both a camming and a wiping action upon the side flaps, turning them inward and downward and pressing them firmly down against the underlying front and rear flaps of the carton. The belts 212 start from far enough out to accept between them the upstanding side flaps of the widest carton within the range of the machine, but extend inward far enough effectively to fold in the side flaps of the narrowest carton within the range of the machine. The belts 212 are carried up and down with the elevator EL2, but require no lateral adjustment.

The side guides 18 extend only through the measuring section, but since the cartons overlap the measuring section and the side flap folding section during a considerable part of the side flap folding operation, the side guides contribute importantly to the resistance of the carton to misalignment or lateral displacement by forces exerted upon it by the belts 212. The conveyor 240 of the folding section is adapted also to resist lateral displacement and misalignment of the carton, being in the form of a belt conveyor. The conveyor 240 comprises a broad belt 242 of frictional material, a driven end drum 244, an idler end drum 246, and an intervening roller table composed of closely spaced idler rollers 248 upon which the active run of the belt 242 is supported. The drum 244 is desirably driven independently of the conveyor 20, but at substantially the same speed, by an independent motor 250. It is not essential that the speeds of the conveyors 20 and 240 be identical.

As the folding in of the side flaps by the belts 212 is completed, the carton stands ready to pass from the belt conveyor 240 onto a conveyor 252 of the taping section, as soon as the taping section is ready to receive it. This means, of course, that the elevator EL3 must have been adjusted to the appropriate height by reference to the position of the elevtor EL2 and the gate GT3 must be open. Under these conditions the carton passes forward onto a conveyor 252 and beneath a holddown roller conveyor 252a which is carried by the elevator EL3. Shortly after entering the taping section, the carton engages and closes switch 90 for causing tape to be fed, moistened, cut and applied both by the overhead mechanism which seals the top center seam of the carton and by underneath mechanism which seals the bottom center seam of the carton.

The rollers 254 of the lower roller conveyor 252 are driven in unison and at constant speed from the motor 259 which is suspended from the frame beneath the conveyor 252, and which is connected through gearing indicated at 256 to drive an intermediate roller 254 of the conveyor 252. The shaft of said roller 254, through a system of chains and sprockets 258 drives all the rollers 254 in unison with itself. The end roller 254 which lies nearest the drum 244 is connected through chain gearing 257 to drive the drum 244.

The general arrangement is similar for the conveyor 252a which is carried by the elevator EL3. A motor 250a, carried by the elevator EL3, serves to drive one roller of the conveyor 252a, and the shaft of that roller serves to drive all the other rollers in unison with itself and in harmony with the rollers of the conveyor 252. Not only are the conveyors 252 and 252a duplicates of one another, but the tape feeding, moistening, cutting and applying means of the upper mechanism are essentially duplicates of the corresponding elements of the lower mechanism. The lower mechanism only will be described, and corresponding reference characters will be applied to corresponding parts of the upper mechanism with the subscript a added in each instance.

One of the rollers 254 has its shaft connected through gearing (not shown) to drive the lower tape feeding means. Such gearing constantly drives rollers 264, 266 and 268 at a peripheral speed equal to the peripheral speed of the rollers 254. The tape feed drive is not completely illustrated in detail, the construction and arrangement being well-known and being as shown and described in United States Letters Patent 2,721,669, granted to Clifford D. Keely on October 25, 1955. The tape T is drawn from a reel 260.

The tape moistening means and the means for causing the tape to be alternately fed and cut are also like the corresponding parts of Patent 2,721,669.

The tape feeding begins as soon as the switch actuating arm 90 is engaged and depressed by the leading end of a carton and continues at the rate of carton travel until the arm 90 is cleared by the trailing end of the carton. The length of tape fed is equal substantially to the length of the carton plus the length of the switch actuator arm 90. The arm 90 is so situated that the surplus tape length is divided substantially equally between front and rear protruding end portions.

The lowermost of the constantly driven rollers 266 is a tape moistening roller. It runs in contact with a water pick-up roller 270. The roller 270 runs in water 272, which water is supplied to a tank 274 from a supply pipe 276 and is maintained automatically at a desired level by a float valve 278.

The armature 280 of a solenoid 282 is arranged, when the solenoid is energized, to thrust downward a lever 284. The lever 284 is pivotally mounted on a fulcrum pin 286. The lever 284 carries on one arm an idler roller 288 which is moved toward and from the constantly driven roller 264 as the solenoid is energized and deenergized, respectively and on the other arm a pinch cutting blade 290 which is moved toward and from a non-driven anvil roller 292 as the solenoid is deenergized and energized, respectiveley. As the solenoid circuit is broken, by opening of the switch 90, causing the solenoid 282 to be deenergized, the roller 288 is moved away from the roller 264 and the blade 290 is snapped into engagement with the anvil roller 292 by a spring 294 to cut the tape. The cut length of tape continues to be fed until it has all been delivered to the carton, but the uncut tape below the knife 290 remains at rest until another carton comes along to energize the solenoid 282.

The shaft 296 of the final roller 254 of the conveyor 252 serves through chain and sprocket gearing 298 to drive the shaft 300 of the lower roll-over device 96 through a slip clutch driver 301. The carrier 302 of the rollers 304 is mounted on the shaft 300 for rotation in unison therewith. The carrier 302 comprises arms 306 which are located at opposite sides of an idler roller 308. The upper roll-over mechanism 96a is a duplicate of the lower roll-over mechanism and is similarly driven.

A sub-frame 310, fixed on the elevator EL3 serves as the support and carrier for the upper roll-over mechanism 96a and the upper roll-down mechanism 94a.

A plunger head 312a includes a rigid, vertically extending guide bar 314a which is guided for vertical restriction to vertical movement in a guideway provided by an extension 310 of elevator EL3. The plunger head 312a is carried at the lower end of the piston rod of an air motor 316a, and is driven down and up by the piston rod. The plunger head 312a has pivoted upon it at 318a a bearing frame 320a for the roll-down roller 322a. The bearing frame 320a includes a pair of parallel angle levers 324a which are connected by a cross bar 326a. A compression coil spring 328a interposed between the plunger head 312a and the crossbar 326a yieldingly urges the frame 320a in a counterclockwise direction (as viewed in FIG. 11). Such movement is limited by engagement of projections 330a of the levers 324a with abutment stops 332a on the plunger head 312a. The spring 328a permits a slight yielding in a forward and upward direction of the bearing frame 356a.

The upper roll-down mechanism has been described in detail rather than the lower one because it is more fully illustrated. The upper and lower mechanisms 96a and 96 are desirably duplicates of one another. Corresponding parts of the lower mechanism, to the extent that it is illustrated, have corresponding reference characters applied with the subscript a omitted in each instance.

There is a minor point of differentiation between the drive gearing 334 for the lower roll-over mechanism 96 and the drive mechanism 334a for the upper roll-over mechanism 96a, arising from the fact that lower conveyors are associated with the lower roll-over mechanism 96, whereas no conveyor is associated with the upper mechanism 96a. As seen in FIG. 11 the upper drive gearing consists merely of sprockets mounted on the shafts 336a and 338a and an intervening chain. The lower drive gearing, however, consists of a first pair of sprockets 340 and 342 on shafts 336 and 344 with a chain 346 running on the sprockets, and a second pair of sprockets 348 and 350 on the shafts 344 and 338 with a chain 352 running on the sprockets. The shaft 344, as seen in FIG. 11, drives a roller 354 which constitutes the drive roller of a conveyor belt 356. At the opposite side of the machine (see FIG. 3), the shaft 336 serves through a second set of sprockets 340 and 348 and a second chain 346 to drive a second shaft 344, and through the latter to drive a second roller 354 by which a second conveyor belt 356 is driven. The conveyor belts 356 run also upon idler rollers 358 at their discharge ends and upon series of idler rollers 360 intermediate their ends. Intermediate frame members 362 are provided for supporting the rollers 354, 358 and 360 at their inner ends.

Further details of the upper roll-down mechanism 94a are illustrated in FIG. 8, having reference particularly to the control of the switch 92 through which a solenoid winding 364a is energized for setting the roll-down actuator into operation. In this instance the actuator is a Bellows air motor of the type in which solenoid energization shifts the air valve to produce a complete automatic cycle of the piston. When the switch actuator arm 92 is engaged by the carton, it is rocked in a counterclockwise direction about a supporting pivot pin 366a, and causes a pawl carrying arm 368a to be rocked counterclockwise with it. A pawl 370a carried by the arm 368a advances a ratchet wheel 372a a single step, causing one tooth of the ratchet wheel to be fed past an anti-back-feed pawl 374a. As the anti-back-feed pawl 374a rides over the passing tooth it momentarily closes the switch 92 and then permits the switch to re-open. The momentary closing of the switch 92 suffices, however, to initiate a full cycle of the roll-down mechanism. The initiation of the roll-down cycle is started early enough so that the roll-down roller 322a will have moved down across the leading end of the carton as the carton approaches the roll-down station, far enough to intercept and arrest the carton for a short time at that station. As the roller 322a continues downward it rolls the leading protruding end of the tape smoothly and firmly down against the leading end of the carton, and it again presses the leading end of the tape against the carton as it returns upward. As soon as the upwardly moving roller 322a clears the carton, the forward feeding of the carton is resumed, and the carton is carried past the switch 88 and out of the machine, desirably onto a further gravity conveyor (not shown).

Figure 14:
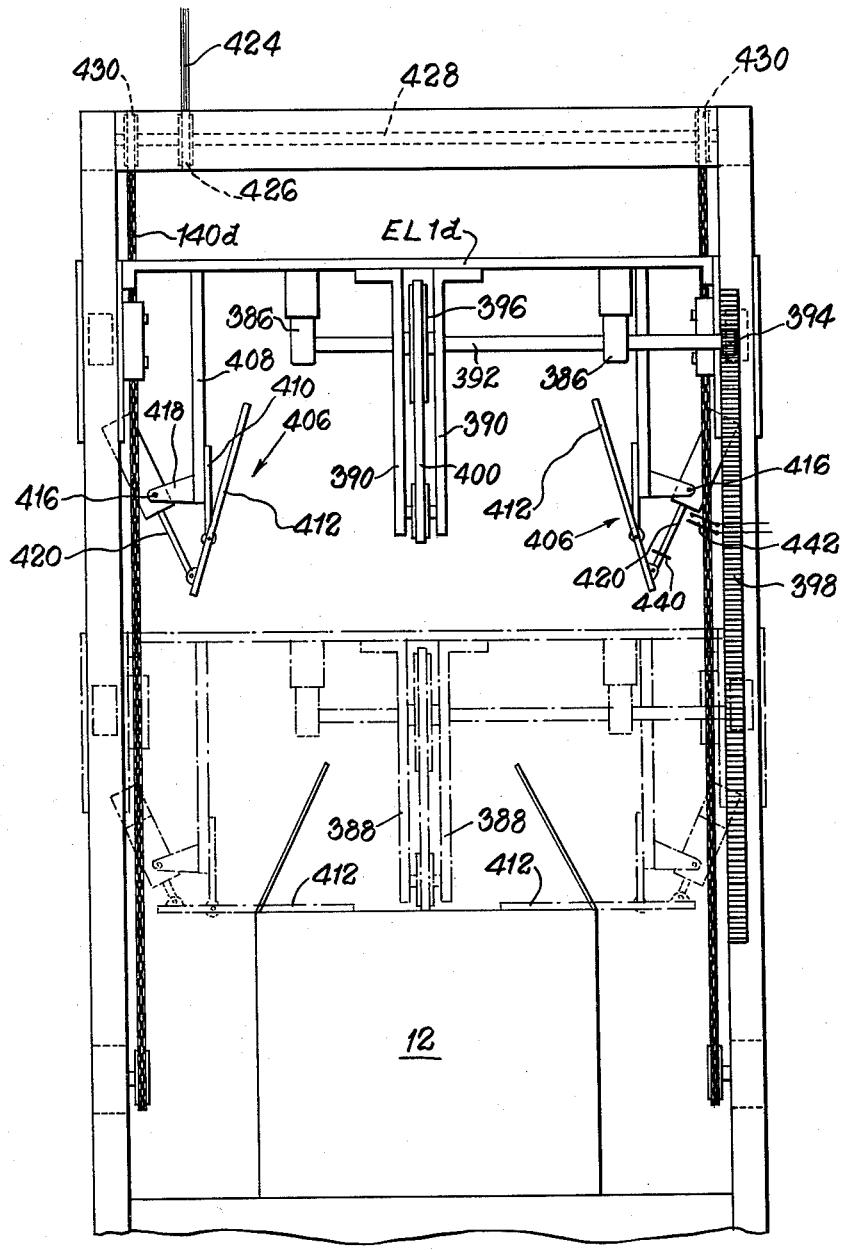
FIGURE 14 is a view in end elevation of the measuring section of FIGURE 13, looking into the discharge end of the measuring section.

In FIGURES 13 and 14 disclosure is made of a modified first section which includes side flap folding means, and which is therefore substitutable for the first and second sections of the machine of FIGS. 1 to 12. Besides adding side flap folders, FIGS. 13 and 14 include an alternative form of rear flap folder. The features particularly illustrated in FIGS. 13 and 14 may be used together or separately.

The structure of FIGS. 13 and 14 is generally like that of the measuring section of FIGS. 1 to 12, including all the structure of those figures except as noted below. Corresponding reference characters have accordingly been applied to corresponding parts in FIGS. 13 and 14 with the subscript d added in each instance, and the description will be confined to the mechanisms which have been added or substituted as compared with the previous showing.

In FIGS. 13 and 14 a belt type rear flap folder 382 is provided in lieu of the rear flap folder 24. The elevator EL1d is made to include an extension platform 384 from which bearing arms 386 and 388 depend. Further bearing arms 390 depend from the interior body portion of the elevator EL1.

A shaft 392, mounted in the bearing arms 386, has fast upon it a pinion 394 and a pulley 396. The pinion 394 is carried up and down by and with the elevator EL1d in mesh with a vertically disposed stationary rack which is affixed to one of the vertical frame members 122d. The pinion 394 drives the pulley 396 at its own rotary speed, and the pulley 396 constitutes a drive for a folder belt 400. The folder belt 400 runs upon a guide pulley 402 which is carried by bearing arms 388, and a guide pulley 404 which is carried by bearing arms 390. The active run of the belt extends horizontally from the guide pulley 402 to the guide pulley 404.

The illustrative pulley 396 has a pitch diameter five times as great as that of the pinion 394, and hence drives the belt 400 linearly at a rate far in excess of that at which the elevator EL1d travels. As the elevator EL1d moves down, the pulley 396 is driven counterclockwise as viewed in FIG. 13, and hence the belt 400 is caused to sweep the free edge or margin of the rear flap forward as it moves downward. Since the belt 400 is brought into operation with the carton at rest, the belt exerts a forward wiping action.

The belt 400 is a toothed belt having forwardly pointed teeth of a soft frictional material such as rubber, provided on the outer face. The forward inclination of the teeth enables the carton flap to slip forward past the teeth as the carton is fed out of the measuring section with the elevator EL1d and the belt 400 at rest in the measuring position.

As the elevator EL1d moves upward, the pulley 396 is turned clockwise, and is thereby caused to drive the belt 400 backward. By this time, however, the carton will have cleared the first section, so that this backward operation of the belt is an idle one.

When, as illustrated in FIGS. 13 and 14, the measuring section also includes side flap folders, it is desirable that the belt 400 and its supporting pulleys and bearing arms be limited to a narrow compass. A standard spacing of one-quarter inch is provided between the edges of the infolded side flaps of a carton. At the time when the side flap folders operate to fold in the side flaps, only the forward end of the active run of the belt, the pulley 404 and the bearing arms 390 stand over the carton, and they are at the rear end of the carton, whereas the side flap folders act at the forward end of the carton. Since the carton flaps can bend to a limited extent, it is not essential that the bearing arms 390, from outer face to outer face, be limited to a space of one-quarter inch, but these arms should be limited, at least at their lower ends, so as to require no greater bending of the side flaps than can comfortably be accommodated.

Figure 16:
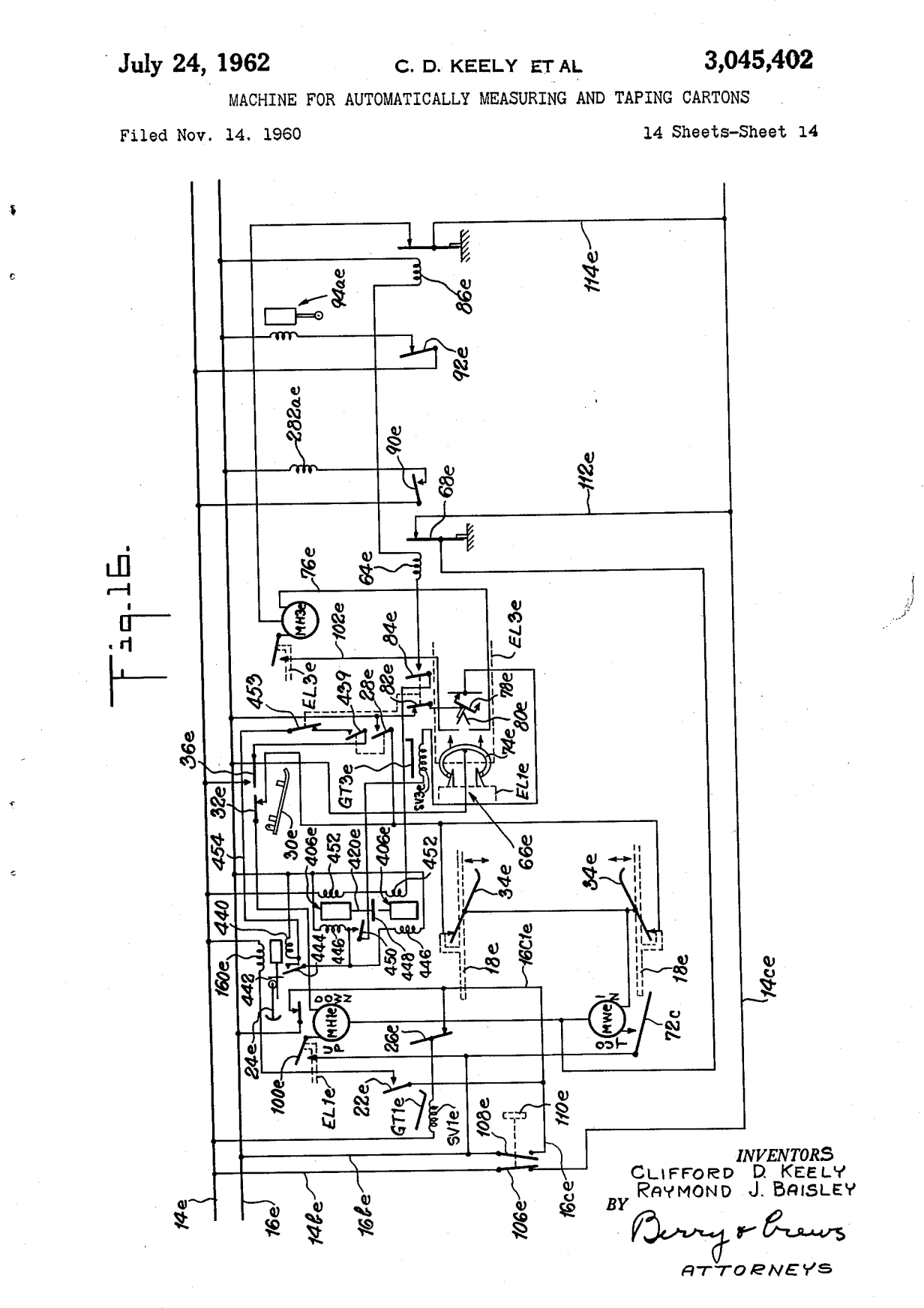

The side flap folders 406, including the operating means means therefor, are carried upon rigid depending arms 408 of the elevator EL1d. Coordination of the side flap folders 406 with the other operating instrumentalities will be explained in connection with FIG. 16, but for the present it is pointed out that the side flap folders are caused to operate at the conclusion of the measuring operation as the feeler arm 30d attains a horizontal position. As illustrated in FIG. 16, the leveling out of the feeler arm does not directly open the gate GT2, but only starts the operation of the side flap folders, the opening of the gate GT2 being delayed until the side flap folding operation is substantially completed.

Each side flap folder comprises a rigid supporting bracket 410 upon which a folding arm 412 is rockably mounted. The actuator 414 of the Bellows air motor type is pivotally mounted, through ears 416 and 418, upon the arm 408. The piston rod 420 is pivotally connected at its outer end to the tail portion of the associated folding arm 412. The piston rod 420 is normally maintained at its outer limit of movement as illustrated in full lines in FIG. 14. Energization of one electromagnetic winding shifts the valve (not shown) causing the piston rod 420 to be drawn into the cylinder and the folding arms 412 to be swung downward to the condition illustrated in broken lines in FIG. 14. After the carton has been well started into the taping section the second electromagnetic winding of the air motor is energized, thereby restoring the folding arm 412 to the upraised condition in which it is illustrated in full lines.

The side flap folders are carried up and down with the elevator EL1d but they are not adjustable laterally of the machine. The pivots of the arms 412 are located outside the lateral bounds of the widest carton, and the arms themselves are made long enough to reach inward well beyond the lateral bounds of the narrowest carton.

The feeler arm 30d is generally like the feeler arm 30 of the machine of FIGS. 1 to 12, but since it is located near the side flap folders and is required to bear against the front flap while having the side flaps folded down at opposite sides of it, it is desirably made not more than one-quarter inch wide. The arms 142d on which the arm 30d is mounted are also made narrow, are located close together, and are caused to terminate some distance above the carton top level. To provide for this latter feature, the arm 30d is provided with a thin upwardly extending supporting stem 422 of substantial height.

With respect to the elevator drive, the embodiment of FIGS. 13 and 14 is no different from that of FIGS. 1 to 12, but the details of the drive are more clearly illustrated in FIGS. 13 and 14. The shaft of motor MH1d, through suitable gearing (not shown) drives chains 424, each of which chains drives a sprocket 426. Each sprocket 426 is fast upon a transverse shaft 428. Each shaft 428 has sprockets 430 fast upon its opposite ends. Each sprocket 430 has an endless chain 140d trained upon it. Each chain 140d is also trained upon a lower fixed sprocket 432. The sprockets 432 are carried on fixed side frame bars 434, the bars being horizontally disposed and located at a short fixed distance above the level of the top of the conveyor 20.

The measuring and folding section illustrated in FIGS. 13 and 14 may be directly attached to, and coordinated in operation with, a taping section like section 3 of FIGS. 1 to 12. The general principle of such coordination and control will be readily apparent from the exposition of that principle in connection with the machine of FIGS. 1 to 12. Details will be discussed in connection with FIG. 16 after the machine of FIGS. 15 and 16 has been described.

Because FIGS. 13 and 14 include the chain belt rear flap folder 382, which depends for its operation upon the rise and descent of the elevator EL1d, it is not possible to switch a machine embodying the folder 400 back and forth between automatic operation for cartons of continuously varying heights, and non-measuring operation for cartons of uniform height. In situations where non-measuring operation is not a factor, the machine of FIGS. 13 and 14 is a very advantageous form of machine.

In FIGS. 15 and 16 disclosure is made of a further modified machine employing all the structure of FIGS. 13 and 14 as a replacement for sections 1 and 2 of the machine of FIGS. 1 to 12, save that a swinging rear flap folder like 24 is included in place of the chain belt folder 382. Since all the structure is found in either FIGS. 1 to 12 or 13 and 14, corresponding reference numerals have been applied to corresponding parts with the subscript e added in each instance, and no detailed description of FIG. 15 will be given. It will be noted that section 2 of the machine of FIGS. 1 to 12 drops out altogether, and that the reference characters applied to section 2 of that machine are not used. Addition of the side flap folders in section 1 and the omission of the former folding section involves some alteration of circuitry and control, and these will be explained in connection with FIG. 16.

In general, the folding section switches drop out along with the folding section itself. The taping section, including particularly the elevator EL3e is controlled by reference to the measuring section. The switches in the taping section which control the folding section of FIG. 12 are made to control the measuring section of FIG. 16. These adaptations are obvious. They will not be described in detail.

Changes in the circuitry have been made in order to bring about a sequence of operations in which the measuring operations of the motors MH1e and MWe are initiated by the closing of the switch 28e as before, then the complete folding operation of the rear flap folder 24e is performed, then the complete folding operations of the side flap folding arms 412e are performed, and finally the opening of the gate GT3e is effected for causing the carton to be advanced into the folding section.

It will be remembered that in FIG. 12 closing of the switch 36 by the feeler arm 30 at the conclusion of the measuring operations resulted directly in the opening of the gate GT2. In the present instance, however, the closing of the switch 36e initiates a chain of events as outlined above. Closing of switch 28e is accompanied by closing of a normally open switch 439 so that the switch 499 will have been closed, and will be held closed with the carton in measuring position. Closing of the switch 36e directly causes energization of a winding 440 which causes the rear flap folder 24e to be swung downward and forward.

It will be remembered that the folder 24 is driven downward by the drawing of a piston rod into the cylinder 158. In this instance the operation is the same, but the piston rod is provided with a switch actuating collar 442 which serves to close a switch 444 at the conclusion of the flap folding operation of the folder 24e.

Closing of the switch 444 serves directly to energize windings 446 which are associated with the respective side flap folders 406e, and which serve to cause the side flap folding arms 412e to execute fully their folding operations.

It will be remembered that the folding arms 412 are caused to fold the side flaps by the pulling inward of a piston 420. In the present instance one of the pistons 420e carries a collar 448, which at the conclusion of the inward stroke of the piston, when the side flap folding operation is complete, closes a switch 450. The closing of the switch 450 causes the winding SV3e to be energized and the gate GT3e to be opened.

The switch 84e of the folding section, besides causing windings 64e and 86e to be energized, is made to perform the additional function of energizing windings 452 through which the side flap folders are caused to be returned to their raised position.

A normally closed switch 453, in series circuit with switches 439 and 36e is opened simultaneously with the closing of switch 84e in order to deenergize the windings 446 and 164e.

The machine of FIGS. 15 and 16 can be converted for faster, non-measuring operation whenever a series of cartons of uniform height and width is to be put through. The conversion is effected by means of a manual operator 110e which simultaneously opens the switch 106e and closes the switch 108e. In this instance, however, the gate GT3e cannot be held continually open but must detain each carton at the end of the first section for a brief period after the completion of the measuring operations, until the rear flap folding and the side flap folding have been effected successively. For that reason, no conductor corresponding to 16c3 has been included in the diagram of FIG. 16. The employment of the gate GT3e does not, however, introduce any very great measure of delay because height adjustment is dispensed with.

For non-measuring operation it would be possible to maintain the gate GT1e open continuously, but it is thought preferable to maintain this gate effective on a modified basis. For that reason the conductor 16c1e is connected at the opposite side of switch 26e from the winding SV1e, and is effective to open the gate GT1e the instant that a carton clears the switch 26e.

The switch 439 is provided especially for non-measuring operation. When elevator EL1e stays down the switch 36e remains continually closed at least until the carton clears the arm 30e, and the switch 439 becomes necessary for timing operation of the rear flap folder and the side flap folders.

The electrical diagram of FIG. 16 is also generally applicable to the machine of FIGURES 13 and 14. Since the chain belt rear flap folder is employed in place of the swinging folder 24e in the machine of FIGS. 13 and 14, however, no electrical means is required in connection with the operation of the rear flap folder and hence the switch 22e and the winding 160e are omitted together with the conductor in which these elements are interposed in FIG. 16. The switch 444 and the winding 440 are also omitted, the conductor 454 being directly connected to the conductor 456. Since the machine of FIGS. 13 and 14 is not adapted for non-measuring operation, the conductor 14bc is directly connected to the conductor 14cc and the switch 106e is omitted. The switch 108e and conductors 16ce and 16c1e are also omitted as unnecessary.

While certain preferred embodiments of the invention have been illustrated and described in detail, it is to be understood that changes may be made therein and the invention embodied in other structures. It is not, therefore, the intention to limit the patent to the specific construction illustrated, but to cover the invention broadly in whatever form its principle may be utilized.

We claim:

1. In a taping machine for automatically measuring the heights of cartons which may vary in height from carton to carton, and for adjusting automatically to the measured height of a carton, in combination, a carton conveyor, an elevator, overhead mechanism carried by the elevator for operating upon the upper ends of conveyor carried cartons, means operable to raise and lower the elevator, means automatically responsive to the carton at a predetermined point in its travel on the conveyor to initiate adjustment of the elevator downward into predetermined relation with the carton top, and means automatically effective to disable the elevator operating means when the prescribed relationship of elevator to carton top has been attained.

2. In a taping machine for automatically measuring the heights of cartons which may vary in height from carton to carton, and for adjusting automatically to the measured height of a carton, in combination, carton conveying means, an elevator, driving means operable to raise and lower the elevator, means automatically responsive to the carton at a predetermined point in its travel to initiate adjustment of the elevator downward into a prescribed relation to the carton top, means temporarily arresting the elevator driving means when the prescribed relationship has been attained, and means responsive to the arrival of the carton at a definite point in its continued advance to cause the elevator to be raised to an upper limit of movement in preparation for the reception of a following carton.

3. In a taping machine for automatically measuring the heights of cartons which may vary in height from carton to carton, and for automatically adopting a setting determined by the measured height of a carton, in combination, carton conveying means, an elevator, driving means operable to raise and lower the elevator, means carried by the elevator for folding in the front top flap of the carton as an incident of the downward movement of the elevator, a gate disposed to arrest the carton for measuring at a measuring station, means automatically responsive to the carton as it nears the gate to initiate adjustment of the elevator downward into predetermined relation to the carton top, and means automatically responsive to the attainment by the elevator of the prescribed relation to the carton top to open the gate and thereby enable the advance of the carton to be resumed.

4. In a taping machine for automatically measuring the heights of cartons which may vary in height from carton to carton, and for automatically adopting a setting determined by the measured height of a carton, in combination, carton conveying means, an elevator, driving means operable to raise and lower the elevator, means carried by the elevator for folding in the front top flap of the carton as an incident of the downward movement of the elevator, a gate disposed to arrest the carton for measuring at a measuring station, means automatically responsive to the carton as it nears the gate to initiate adjustment of the elevator downward into a prescribed relation to the carton top, means automatically responsive to the attainment by the elevator of the prescribed relation to the carton top, to open the gate and thereby enable the advance of the carton to be resumed, and means disposed for engagement and actuation by the carton at a definite point in the resumed advance of the carton, and effective when so actuated to cause the elevator driving means to raise the elevator to an upper limit of movement in preparation for the reception of a following carton beneath it.

5. In a taping machine for automatically measuring the heights and widths of cartons which may vary in height and/or width from carton to carton, and for adjusting automatically to the measured height and width of a carton, in combination, carton conveying means, side guides operable in and out symmetrically, an elevator, means operable to raise and lower the elevator, means carried by the elevator for folding in the front and rear top flaps, a gate normally maintained in position to arrest a carton for measuring, means automatically responsive to the carton as it nears the gate to adjust the side guides inward into snugly confining relation to the carton, and to adjust the overhead elevator downward into a prescribed relation to the carton top, and means automatically responsive to the attainment by the elevator of the prescribed relation to the carton top to open the gate and thereby cause the advance of the carton to be resumed.

6. In a taping machine for automatically measuring the heights and widths of cartons which may vary in height and/or width from carton to carton, and for adjusting automatically to the measured height and width of a carton, in combination, carton conveying means, side guides operable in and out symmetrically, an elevator, means operable to raise and lower the elevator, means carried by the elevator for folding in the front and rear top flaps, a gate normally maintained in position to arrest a carton for measuring, means automatically responsive to the carton as it nears the gate to adjust the side guides inward into snugly confining relation to the carton, and to adjust the overhead elevator downward into a prescribed relation to the carton top, means automatically responsive to the attainment by the elevator of the prescribed relation to the carton top to open the gate and thereby cause the advance of the carton to be resumed, and means responsive at a definite point in the resumed advance of the carton to cause the elevator to be raised to an upper limit of movement and the side guides to be moved outward to outer limits of movement in preparation for the reception of a following carton beneath the elevator and between the side guides.

7. In a taping machine automatically adjustable to the width of a carton, in combination, carton conveying an electric motor, a pair of opposed side guides, an electric motor operable to drive the side guides either inward or outward symmetrically with reference to a longitudinal, central, carton feed line, feelers carried by the respective side guides and each displaceable relative to the associated side guide when carried into engagement with a carton, a pair of normally closed current supply switches connected in parallel between an electrical source and the electric motor, each associated with one of the feelers and each adapted to be opened by displacement of the associated feeler relative to the side guide on which the feeler is carried, the construction and arrangement being such that the motor is responsive to the feelers to terminate inward movement of the side guides, but only when both feelers have been displaced to a prescribed extent relative to the side guides by engagement with the opposite sides of the carton.

8. In a taping machine, in combination, carton conveying means, a pair of opposed side guides, means operable to drive the side guides either inward or outward symmetrically with reference to a longitudinal, central, carton feed line, feelers carried by the respective side guides and each displaceable relative to the associated side guide when carried into engagement with a carton, control means responsive to the feelers to terminate inward movement of the side guides, but only when both feelers have been displaced to a prescribed extent relative to the side guides by engagement with the opposite sides of a carton, and means responsive to the arrival of the carton at a prescribed point in its further advance to cause the side guides to be returned to outer limits of movement in preparation for the reception of a following carton between them.

9. In a taping machine, in combination, carton conveying means, a first elevator located in a measuring section of the machine, overhead mechanism carried by the elevator for folding in the leading and trailing end flaps of the carton, driving means operable to raise and lower said elevators, means automatically responsive to the carton at a predetermined point in its travel on the conveyor means to initiate adjustment of the elevator downward into a prescribed relation with the carton top, means automatically effective to arrest the elevator operating means when the prescribed relation of the elevator to the carton top has been attained, a second elevator located in a second section of the machine, means carried by the second elevator for operating upon the upper end of the carton, a gate for detaining the carton in the measuring section during the measuring operation, means for automatically adjusting the second elevator into correspondence with tthe adjustment of the first elevator, and means for opening the gate to permit further advance of the carton when the adjustment of the second elevator is completed.

10. In a taping machine, in combination, carton conveying means, a first elevator located in a measuring section of the machine, overhead mechanism carried by the elevator for folding in the leading and trailing end flaps of the carton, driving means operable to raise and lower said elevators, means automatically responsive to the carton at a predetermined point in its travel on the conveyor means to initiate adjustment of the elevator downward into a prescribed relation with the carton top, means automatically effective to arrest the elevator operating means when the prescribed relation of the elevator to the carton top has been attained, a second elevator located in a side flap folding section of the machine, automatic side flap folders carried by the second elevator, a gate for detaining the carton in the measuring section during the measuring operation, means for automatically adjusting the second elevator into correspondence with the adjustment of the first elevator by reference to the adjustment of the first elevator, and means for opening the gate to permit further advance of the carton when the adjustment of the second elevator is completed.

11. In a taping machine, in combination, a carton conveying means, a first elevator located in a measuring section of the machine, overhead mechanism carried by the elevator for folding in the leading and trailing end flaps of the carton, driving means operable to raise and lower said elevator, means automatically responsive to the carton at a predetermined point in its travel on the conveyor means, to initiate adjustment of the elevator downward into a prescribed relation to the carton top, means automatically effective to arrest the elevator operating means when the prescribed relation of the elevator to the carton top has been attained, a second elevator located in a second section of the machine, means carried by the second elevator for operating upon the upper end of the carton, a gate for detaining the carton in the measuring section during the measuring operation, means automatically adjusting the second elevator into correspondence with the adjustment of the first elevator, means for opening the gate to permit further advance of the carton when the adjustment of the second elevator is completed, and means responsive to the carton for automatically returning the first elevator to an upper limit of movement when the carton has been carried clear of the measuring section.

12. A machine as set forth in claim 11 which further includes a normally closed gate for controlling the admission of cartons singly to the first section, and means responsive to the arrival of the first elevator at its upper limit of movement automatically to open the last mentioned gate.

13. In a taping machine, in combination, carton conveying means, a first elevator located in a measuring section of the machine, overhead mechanism carried by the elevator for folding in the leading and trailing end flaps of the carton, driving means operable to raise and lower said elevators, means automatically responsive to the carton at a predetermined point in its travel on the conveyor means to initiate adjustment of the elevator downward into a prescribed relation with the carton top, means automatically effective to arrest the elevator operating means when the prescribed relation of the elevator to the carton top has been attained, a second elevator located in a second section of the machine, means carried by the second elevator for operating upon the upper end of the carton, a gate for detaining the carton in the measuring section during the measuring operation, means for automatically adjusting the second elevator into correspondence with the adjustment of the first elevator, means for opening the gate to permit advance of the carton into the second section when the adjustment of the second elevator is completed, means preventing adjustment of the second elevator so long as a carton is present in the second section, and means responsive to the travel of the carton to a position clear of the second section for enabling the adjusting means for the second elevator to operate.

14. In a taping machine, in combination, carton conveying means, a first elevator located in a measuring section of the machine, overhead mechanism carried by the elevator for folding in the leading and trailing end flaps of the carton, driving means operable to raise and lower said elevators, means automatically responsive to the carton at a predetermined point in its travel on the conveyor means to initiate adjustment of the elevator downward into a prescribed relation with the carton top, means automatically effective to arrest the elevator operating means when the prescribed relation of the elevator to the carton top has been attained, a second elevator located in a side flap folding section of the machine, automatic side flap folders carried by the second elevator, a gate for detaining the carton in the measuring section during the measuring operation, means for automatically adjusting the second elevator into correspondence with the adjustment of the first elevator by reference to the adjustment of the first elevator, means for opening the gate to permit further advance of the carton when the adjustment of the second elevator is complete, a third elevator located in a taping section of the machine, instrumentalities carried by the third elevator and automatically responsive to the carton itself to feed out, and apply to the carton, a measured length of tape, a gate at the discharge end of the side flap folding section for detaining the carton against advance into the taping section, means for automatically adjusting the third elevator into correspondence with the adjustment of the second elevator, and means for opening the gate at the discharge end of the side flap folding section when the adjustment of the third elevator is complete.

15. In a taping machine including measuring, side flap folding and taping sections and comprising, in combination, a first elevator in the measuring section, overhead front and rear flap folders carried by the first elevator, a second elevator in the side flap folding section, overhead side flap folding mechanism carried by the second elevator, a third elevator in the taping section, overhead taping mechanism carried by the third elevator, conveyor means for carrying the cartons successively through the three sections, normally closed gates controlling admission of cartons to the respective sections, drive means for operating the respective elevators up and down, the first between the upper limiting position and a lower measuring position determined by the height of the measured carton, and the second and third each into correspondence with the adjustment of the elevator of the preceding section, means requiring the first section to be cleared before its elevator can be operated to the upper limiting position, means respectively requiring the other sections to be cleared before their respective elevators can be adjusted into correspondence with the elevators of the preceding sections, and means respectively requiring the first elevator to be in its uppermost position, and each of the following elevators to be adjusted into correspondence with the elevator which precedes it, as a condition precedent to the opening of the associated gate for admitting a carton to the section in which the particular elevator is located.

16. A taping machine divided into sections and comprising, in combination, overhead operating instrumentalities which include means for first folding in the upper leading and rear flaps, means for then folding in the upper side flaps, and mechanism for finally taping the upper end of the carton, conveyor means for feeding the cartons through the successive sections, a plurality of elevators, one in each section, and each carrying a portion of the operating instrumentalities, the division of the operating instrumentalities between elevators being such that the instrumentalities may act upon a carton in the sequence herein stated, driving means for driving the respective elevators up and down, carton admission gates for each section, means preventing the opening of the first gate until after the first elevator has been operated to an upper limit of movement, means preventing operation of the first elevator to its upper limit of movement until after a measured carton has progressed to a predetermined point in the second section, means responsive to travel of a carton in the first section to cause the first elevator to be adjusted downward into a prescribed relation with the carton top, means for causing any elevator other than the first to be adjusted in height to correspond to the adjustment of the elevator which precedes it, means preventing the initiation of such height adjustment until the involved section is clear, and means responsive to the completion of such height adjustment to cause the admission gate of the involved section to be opened.

17. A taping machine as set forth in claim 16 in which all the elevator operating means are electrically controlled and which further includes switch actuating means operable at the will of the operator to a nonautomatic setting and instantaneously effective when so operated to disable all the elevator driving means, the construction and arrangement being such that a series of cartons of uniform height and width may be put through the machine, flap folded and taped, without measuring any carton after the first one, and without the delays involved in elevator adjustment.

18. A taping machine as set forth in claim 16 in which the elevator operating means and the gate opening means are electrically controlled and which further includes switch activating means operable at the will of the operator to a nonautomatic setting and instantaneously effective when so operated to disable all the elevator driving means and to set and maintain all the gates in open condition, the construction and arrangement being such that a series of cartons of uniform height and width may be put through the machine, automatically flap folded and taped, without measuring any carton after the first one, without the delays involved in elevator adjustment, and without interruption of advance by the gates.

19. A taping machine as set forth in claim 16 in which the taping mechanism includes means responsive to the carton for feeding out, cutting off and applying a measured length of tape which exceeds the length of the carton by a predetermined amount and which, as initially applied, protrudes beyond the carton at the front and rear, an untimed, impositively driven roll-over device for pressing the rearwardly protruding tape end against the rear face of the carton, and a carton responsive rolldown device for pressing the forwardly protruding tape end against the leading face of the carton.

20. A taping machine as set forth in claim 16 in which the overhead taping mechanism is duplicated beneath the conveyor determined carton path for taping the lower end of the carton.

21. A fully automatic machine for taping cartons of varying heights comprising, in combination, a first or measuring and flap folding section and a second or taping section, an elevator in each section, driving means for driving the respective elevators up and down, conveyor means for carrying each carton successively through the sections, gates controlling carton admission to the respective sections, means carried by the first elevator and responsive to travel of a carton in the measuring and flap folding section to cause the first elevator to be adjusted downward into a predescribed relation with the carton top and coordinately to fold in the front flap, the rear flap and the side flaps, means requiring completion of the adjusting and flap folding operations referred to as a condition precedent to the opening of the gate which controls the admission of cartons to the taping section, an overhead taping mechanism carried by the second elevator, means responsive to the adjustment of the first elevator for causing the second elevator to be adjusted heightwise into correspondence with the first, means requiring the taping section to be cleared as a condition precedent to the initiation of such adjustment of the second elevator, means requiring the adjustment of the second elevator to be completed as a condition precedent to the opening of the gate which controls admission of the cartons to the taping section, and means requiring the carton to have reached a prescribed point in the second section as a condition precedent to the opening of the gate which controls admission of cartons to the first section.

22. A machine as set forth in claim 21 in which all the elevator operating means are electrically controlled and which further includes switchover means operable at the will of the operator to a non-automatic setting and instantaneously effective when so operated to disable the driving means for both elevators, the construction and arrangement being such that cartons of uniform size can be put through without the measuring of any carton other than the first and without the delay involved in elevator adjustments, said switchover means being also operable at the will of the operator back to the normal or automatic setting, when the machine is clear of cartons, instantaneously to restore the automatic measuring and elevator adjusting mode of operation for cartons of varying heights.

23. A machine as set forth in claim 21 in which the rear flap folding means carried by the first elevator comprises a swingable arm, means responsive to the carton travel for causing the arm to be swung back and up out of the way in time to permit the upstanding rear flap to pass clear of the arm, and means also responsive to carton travel for causing the arm to be swung down and forward to fold in the rear flap after the rear flap has passed the arm.

24. A machine as set forth in claim 21 in which the rear flap folding means carried by the first elevator comprises a chain belt which has a horizontal active run of substantial length in the direction of carton travel, said chain belt being engageable with the rear flap of a carton as the elevator moves down, and means concurrently driving the active run of the chain belt at a rate considerably in excess of the rate of downward movement of the elevator.

25. A machine as set forth in claim 21 in which the means for folding in the front flap comprises a rockable feeler arm which is progressively rocked from an inclined position into a horizontal position by engagement with the front flap as the feeler arm is carried downward by the first elevator, means responsive to the arrival of the feeler arm in horizontal position to arrest downward movement of the elevator, means also responsive to the arrival of the feeler arm in a horizontal position to operate the rear flap folder, and means responsive to the operation of the rear flap folder, near the completion of such operation, to operate the side flap folders.

26. A machine as set forth in claim 21 in which the means for folding in the front flap comprises a rockable feeler arm which is progressively rocked from an inclined position into a horizontal position by engagement with the front flap as the feeler arm is carried downward by the first elevator, means responsive to the arrival of the feeler arm in a horizontal position to arrest downward movement of the elevator, means also responsive to the arrival of the feeler arm in a horizontal position to operate the rear flap folder, and means responsive to the operation of the rear flap folder, near the completion of such operation, to operate the side flap folders, the front flap folding feeler arm and the rear flap folder being sufficiently narrow to remain in their operated positions during side flap folding without materially interfering with, or limiting, the side flap folding operation.

27. In a carton flap-folding and taping machine, in combination, carton conveying means, means for automatically folding in the leading top flap of a carton, a normally idle, endless, flexible, orbitally movable, rear flap folder having an active run engageable with the rear flap of the carton, control means engaged and tripped by the carton at a predetermined point in the travel of the carton on the conveying means, to set the rear flap folder into operation with the active run traveling forward relative to the free edge of the rear flap during rear flap folding, means for folding in the top side flaps after the folding in of the rear flap has been completed, and means for thereafter automatically tape sealing the carton.

References Cited in the file of this patent

UNITED STATES PATENTS 2,263,739    Rose ------------------ Nov. 25, 1941